Figure 1:
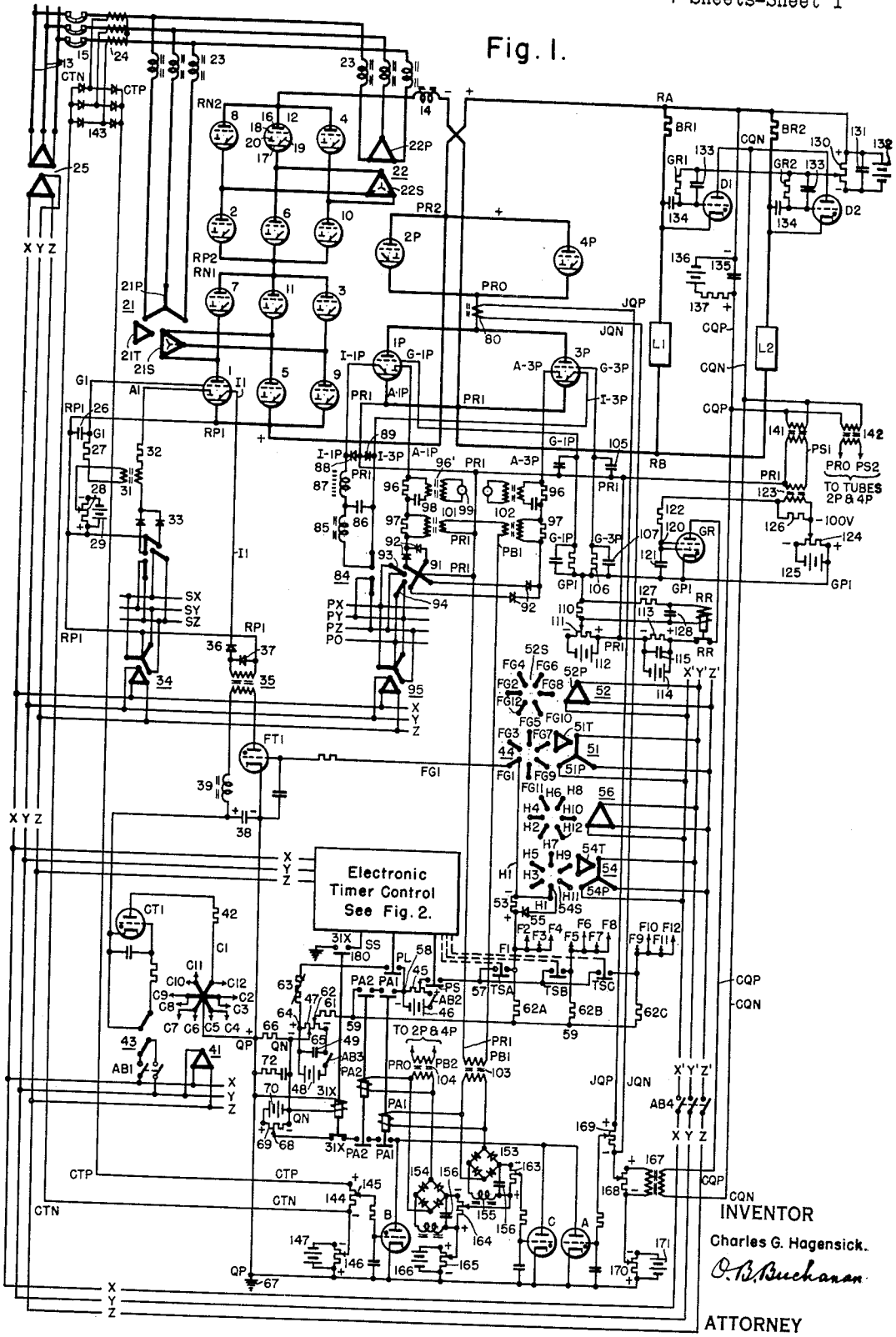

Jan. 31, 1956

C. G. HAGENSICK 2,733,400

RECTIFIER CONTROL APPARATUS

Filed Jan. 19, 1953

7 Sheets-Sheet 1

INVENTOR
Charles G. Hagensick.
O. B. Buchanan
ATTORNEY

INVENTOR
Charles G. Hagensick.

Jan. 31, 1956 C. G. HAGENSICK 2,733,400
RECTIFIER CONTROL APPARATUS
Filed Jan. 19, 1953 7 Sheets-Sheet 3
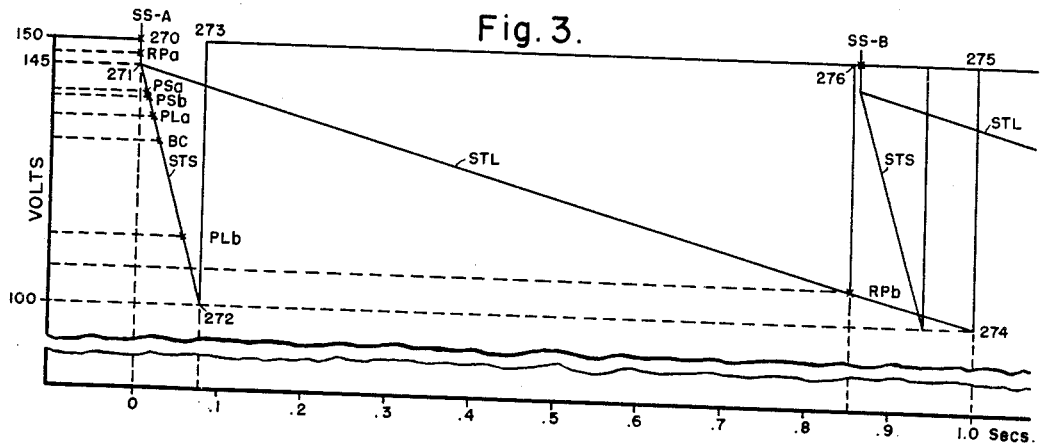
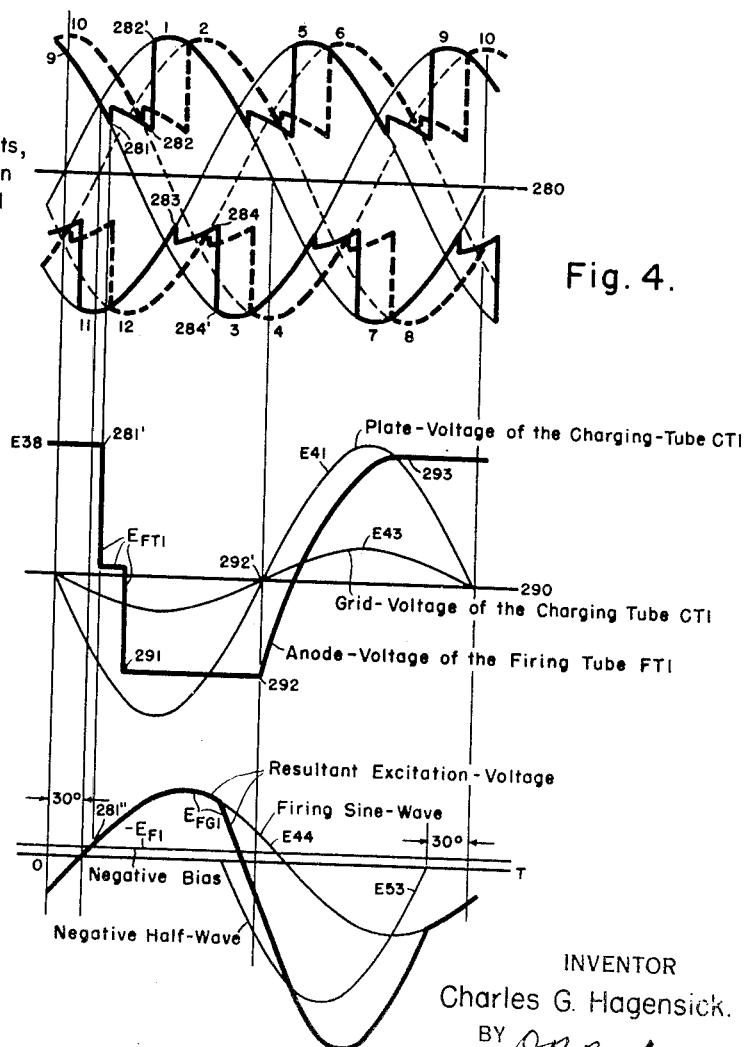
WITNESSES:
Robert C. Baird
Leon M. Garman
INVENTOR
Charles G. Hagensick.
BY O. B. Buchanan
ATTORNEY

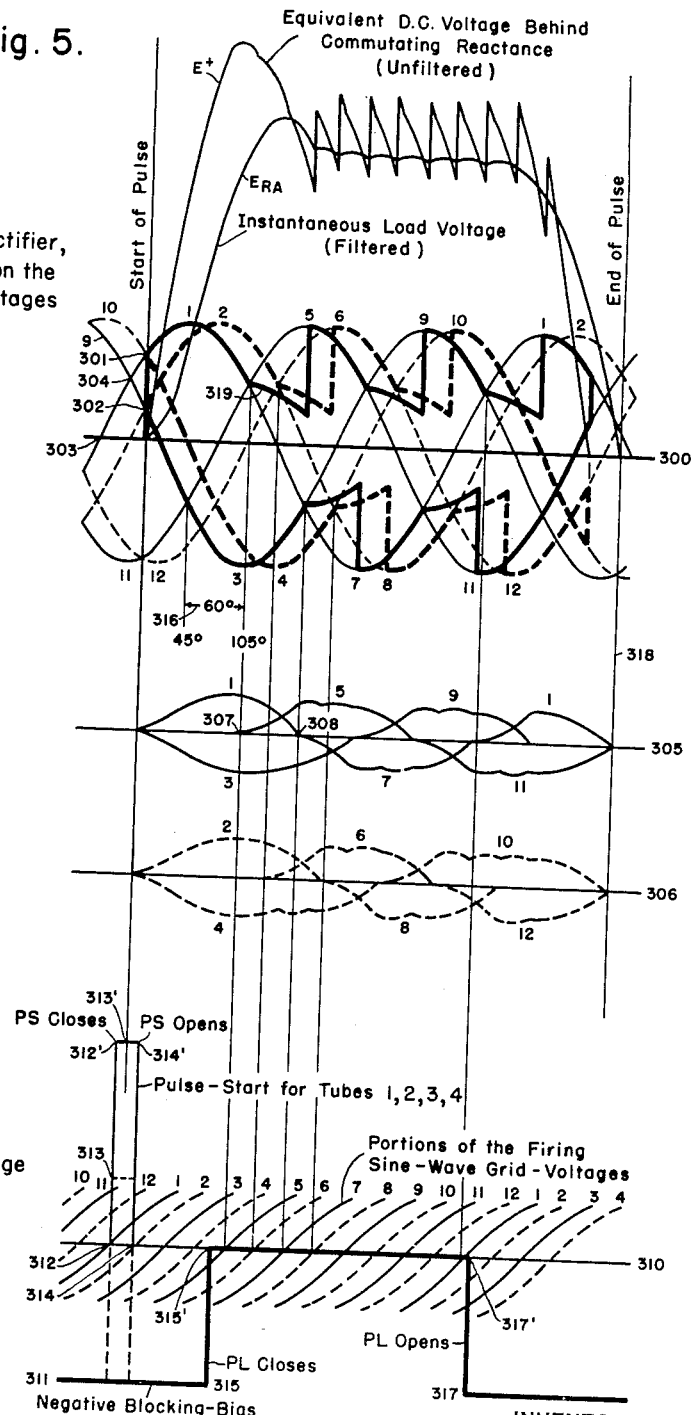

Jan. 31, 1956

C. G. HAGENSICK 2,733,400

RECTIFIER CONTROL APPARATUS

Filed Jan. 19, 1953

7 Sheets-Sheet 5

INVENTOR
Charles G. Hagensick.
C. B. Buchanan
ATTORNEY

Jan. 31, 1956 C. G. HAGENSICK 2,733,400
RECTIFIER CONTROL APPARATUS
Filed Jan. 19, 1953 7 Sheets-Sheet 6

INVENTOR
Charles G. Hagensick.
BY G. B. Buchanan
ATTORNEY

Jan. 31, 1956

C. G. HAGENSICK 2,733,400

RECTIFIER CONTROL APPARATUS

Filed Jan. 19, 1953

7 Sheets-Sheet 7

INVENTOR
Charles G. Hagensick.
BY *O. B. Buchanan*
ATTORNEY

United States Patent Office 2,733,400
Patented Jan. 31, 1956

2,733,400

RECTIFIER CONTROL APPARATUS

Charles G. Hagensick, Pittsburgh, Pa., assignor to Westinghouse Electric Corporation, East Pittsburgh, Pa., a corporation of Pennsylvania Application January 19, 1953, Serial No. 332,035

17 Claims. (Cl. 321—14)

My invention relates to control-apparatus for rectifier-circuits, including such features as a very rapid and flexible broad-range delayed-firing control, with or without the use of a firing-capacitor which is charged through a delayed-firing charging-tube; also, means for providing a gradual initial buildup of the output-voltage of the rectifier, when voltage is first applied to the output-circuit of the rectifier; and also special arc-suppression means, for protecting the rectifier.

A rapid changeable firing-angle is particularly needed when an unusually accurate control of the output-voltage is needed, or when it is necessary, for any other reason, to very rapidly change the firing-angle to any one of a number of adjustable points, over a considerable range of firing angles. In rectifier-applications which require only a slow speed of phase-shift of the firing-angle (such as a time of ten cycles or much higher), the required characteristics can be obtained with a mechanically moving phase-shifter, or with a type of firing circuit using a phase-controlling reactor having a variable amount of saturation. Phase-shifting delayed-firing controls have also been known, which have used grid-controlled firing-tubes having one or more peaking transformers connected in the grid-circuit of the firing-tube, with means for rapidly changing the biasing voltage of this grid-circuit, so as to vary the effective position of the zero grid-control voltage, and thus vary the effective height of the peak or peaks.

An essential feature of my rapid, broad-range firing-control apparatus is the use of a sine wave for the tube-firing voltage in the grid-circuit of the firing-tube, and to control the point, along this sine-wave firing-voltage, at which the firing-tube is fired, by controlling the amount and the direction or polarity of the grid-biasing voltage. This combination can be used with or without any one or more of various auxiliary devices, such as a peaker, or a negative half-wave bucking-voltage, or a delayed firing of a charging-tube for charging a firing-capacitor which serves as the plate-voltage supply for the firing-tube.

In many rectifier-applications, particularly high-voltage rectifiers which are used to energize electronic circuits, it is desirable to prevent the sudden application of the full rectifier output-voltage to the load-circuit, in order to prevent shock-excitation, and possible failure of the electronic equipment. There is a need, therefore, for a means for slowing down the initial buildup of the output-voltage of the rectifier, so as to require a certain length of time, such as four or five milliseconds, more or less, before the full steady-state output-voltage of the rectifier is applied to the load-circuit. A voltage-buildup curve which is similar to the first quarter of a 60-cycle sine-wave is often suitable for this purpose. My present invention provides two alternative means for accomplishing this end. One delayed-buildup means uses a rectifier-circuit having a large number of rectifier-tubes, only a few of which are initially fired, preferably by means of a synchronized pulse which is suitably synchronized with the polyphase supply-voltage which is applied to the rectifier-tubes which are selected to be fired first. Another delayed-buildup means uses the previously described sine-wave firing-voltage in the grid-circuit of the firing-tube for each of the plurality of rectifier-tubes, and provides a circuit including a suitable inductance for adding a positive biasing voltage to an initially blocked grid-circuit for each of the firing-tubes, so that the brid bias changes according to an exponential curve, because of this inductance, thus gradually decreasing the firing-angles of the rectifier-tubes.

In rectifier-equipments which are used for supplying loads which are subject to severe, frequently occurring, faults which amount practically to short-circuits on the rectifying equipment, it is quite desirable to protect the rectifiers during the time when the fault is being cleared, either on the alternating-current side or the direct-current side of the rectifiers. One feature of my invention is therefore to provide current-transformers in the polyphase supply-circuits for the rectifiers, and to provide a rectified output from said current-transformers, with a means for using this rectified current-transformer output in an arc-suppressing means for incapacitating the control-circuit means (such as the firing tubes) of the several rectifier-tubes. In this way, I am able to arc-quench the fault-currents very rapidly, thus minimizing the duty on the rectifier-tubes, and preventing or minimizing the development of arc-backs and other defects within the tubes.

With the foregoing and other objects in view, my invention consists in the circuits, systems, combinations, parts, apparatus, and methods of design and application, hereinafter described, and illustrated in the accompanying drawing, wherein.

Figure 2:
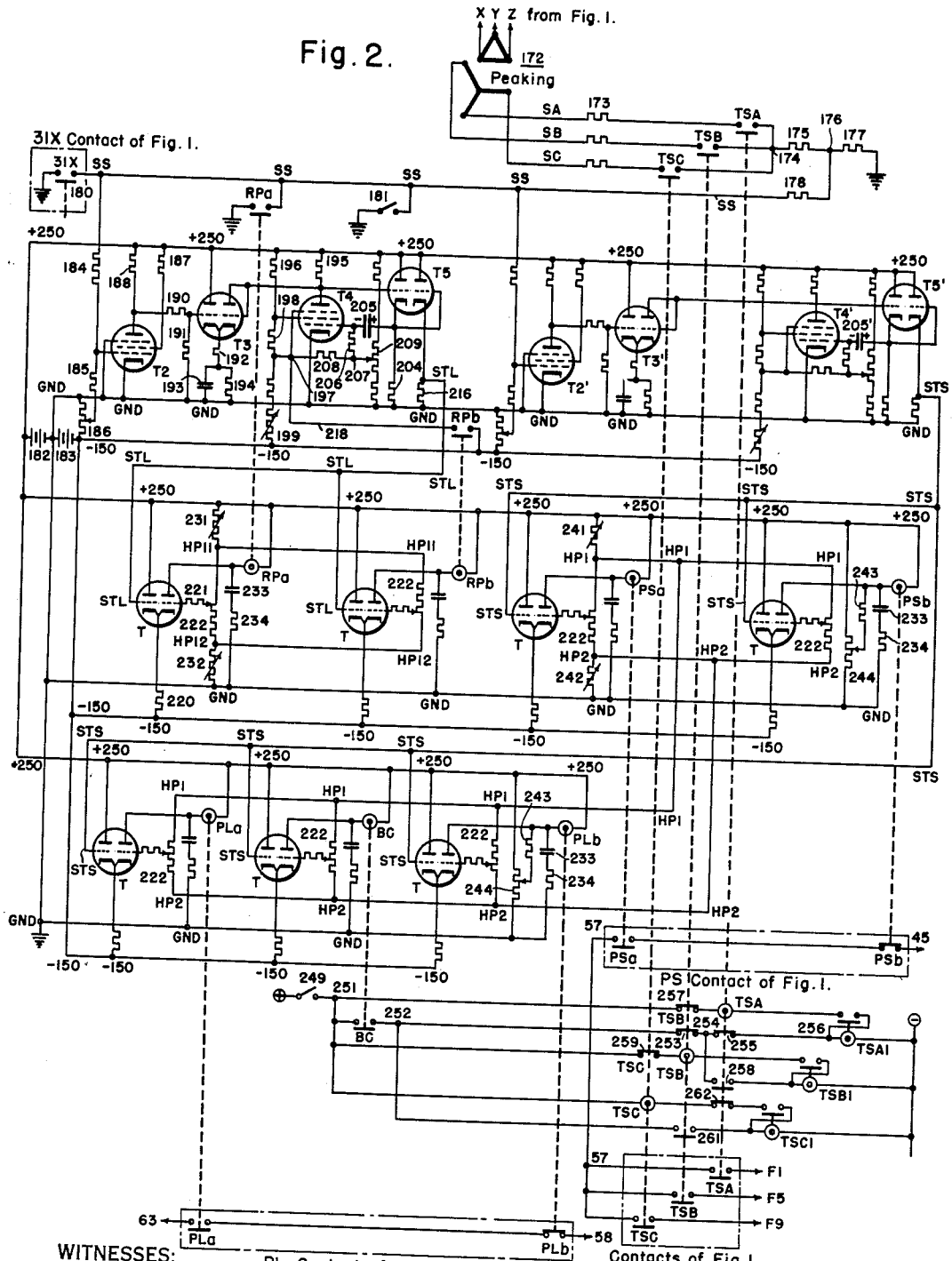
Figure 6:
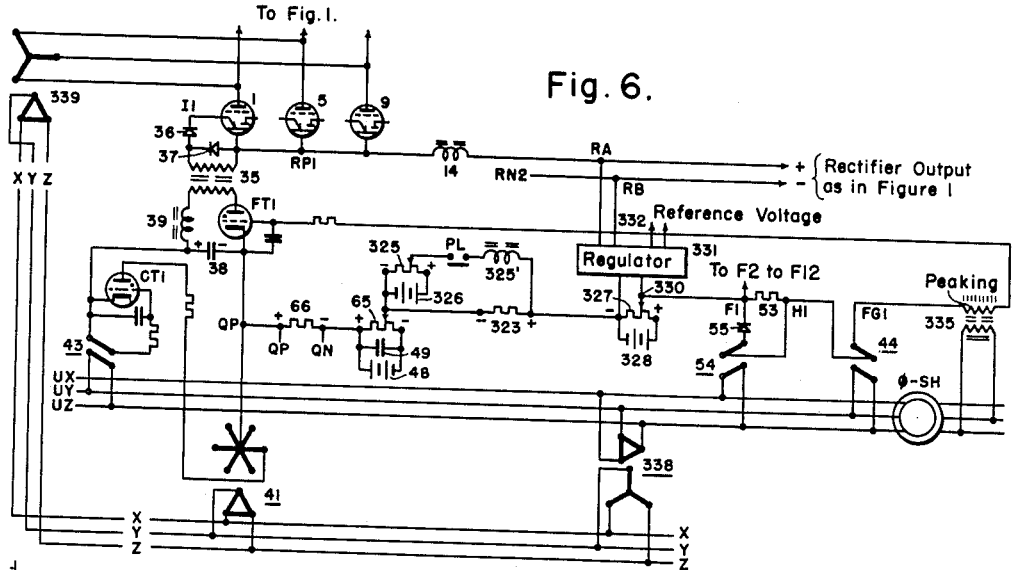
Figure 7:
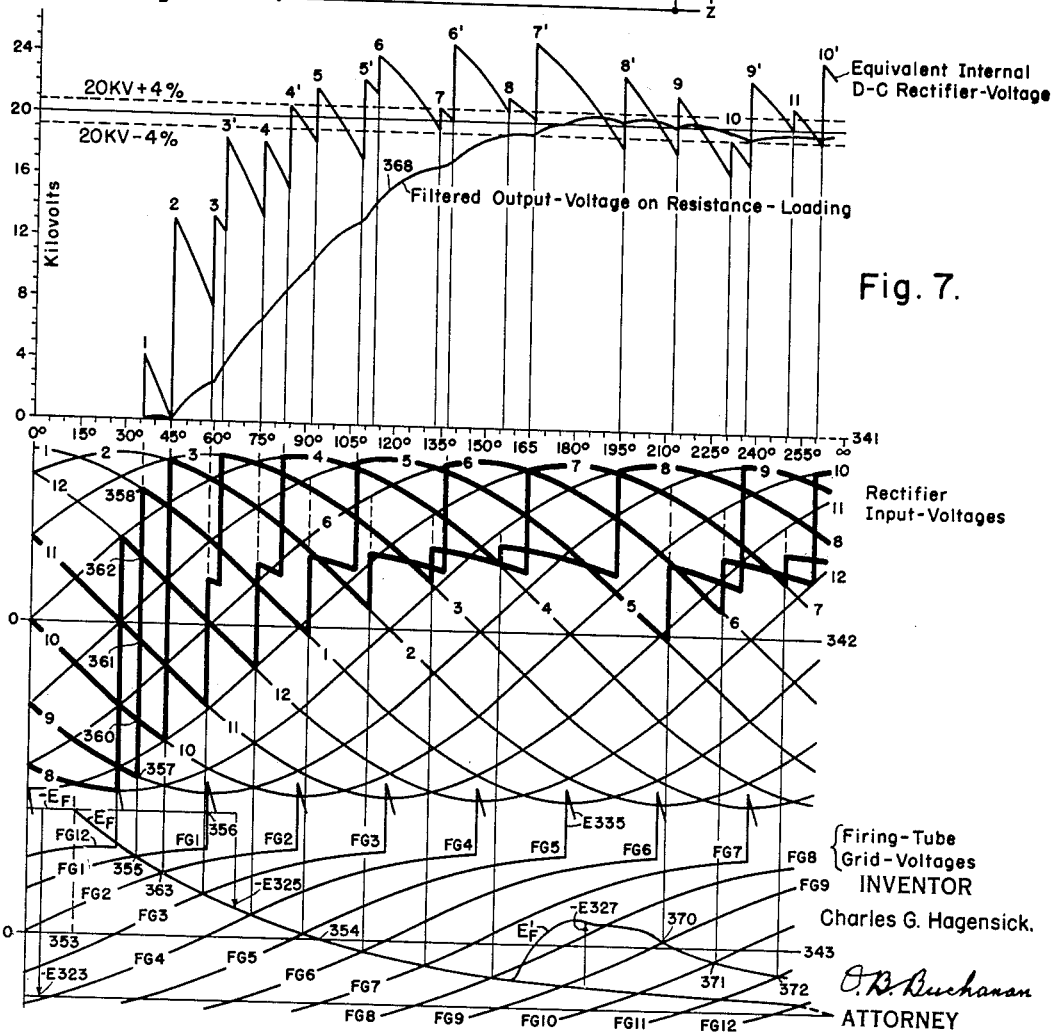
Figure 8:
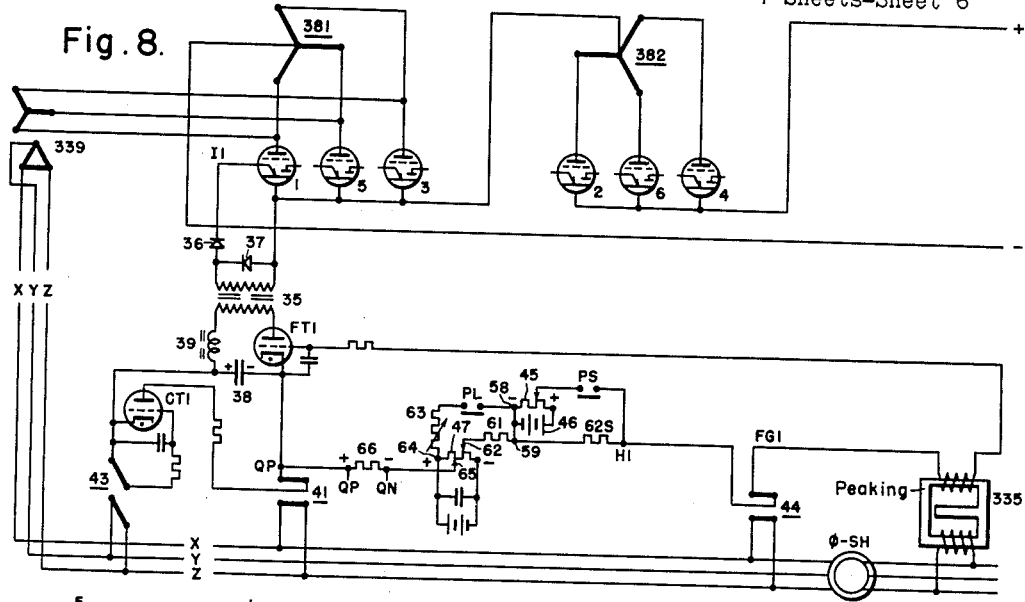
Figure 9:
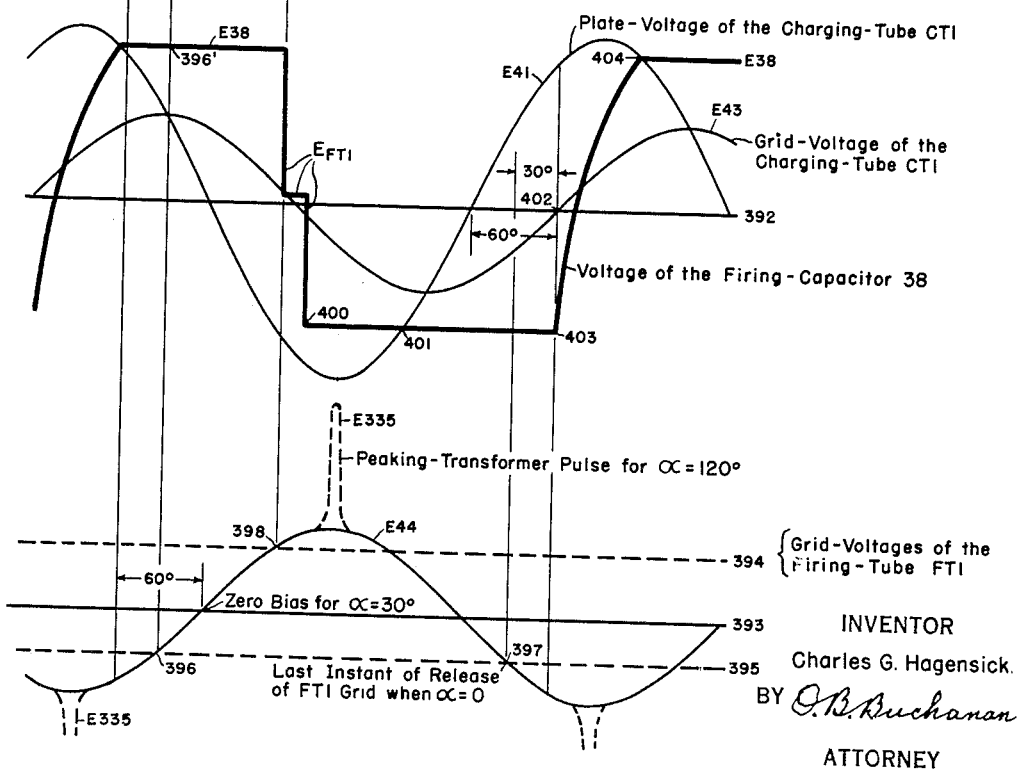
Figure 10:
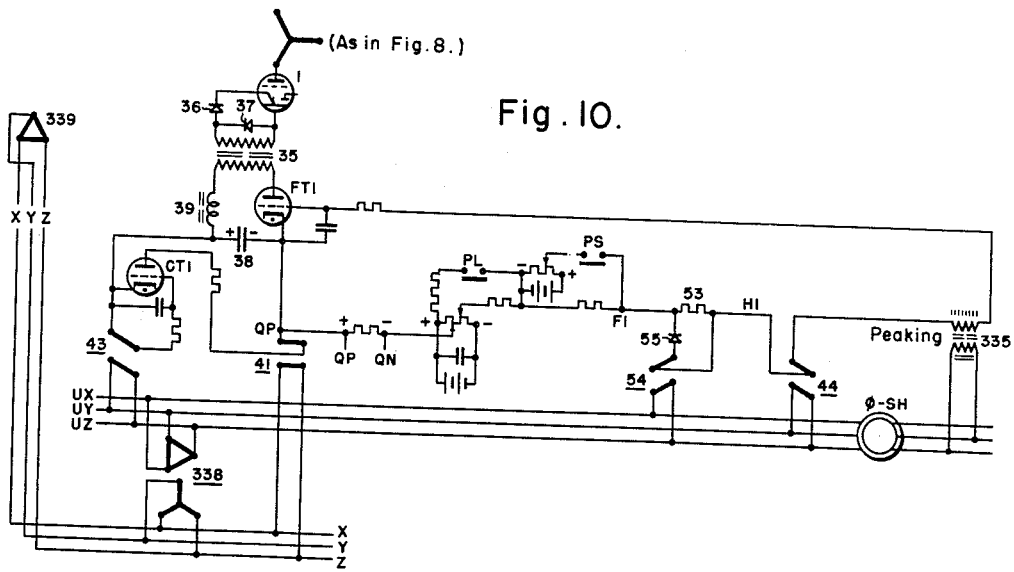
Figure 11:
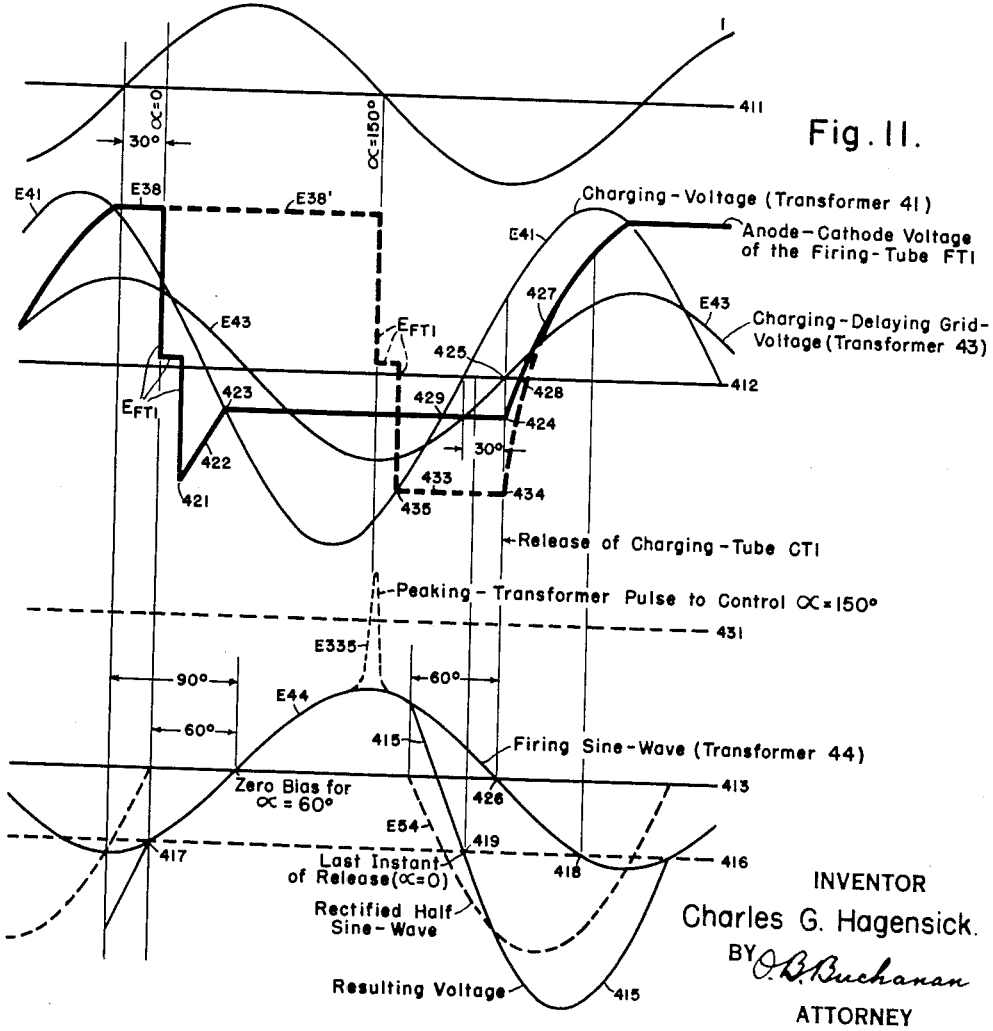

Figure 1 is a considerably simplified drawing of an otherwise complete equipment, including circuits and apparatus, illustrating one form of embodiment or application of my invention, in a form in which two parallel-connected protector-tubes or protector-tube circuits are used, in which the exciting anode of first one tube and then the other is fired, so that at least one of the tubes is carrying a holding-arc at all times, although neither one of the tubes carries such an arc continuously, Fig. 2 is a simplified diagram of circuits and apparatus indicating an electronic timer-control which is indicated by block-diagram in Fig. 1, Fig. 3 is a time-diagram of certain features of the timer-control, Fig. 4 is a diagram showing exemplary waveforms and phase-relationships illustrating the excitation of the ignitor of one of the rectifier-ignitrons which are shown in Fig. 1, Fig. 5 is a diagram showing exemplary illustrative wave-forms and phase-relationships illustrating the initiation and ending of a single pulse of direct-current voltage on the power-line, with a gradual initial voltage-buildup according to a method in which only some of the rectifier tubes are fired at the very beginning of the pulse, according to the control-equipment which is shown in Fig. 1, Fig. 6 is a diagrammatic view of circuits and apparatus, illustrating a modified form of a portion of the equipment which is shown in Fig. 1, whereby a gradual initial voltage-buildup is attained by rapidly changing the initial-delay of all of the rectifier-tubes during the buildup-period, Fig. 7 is a diagram showing exemplary wave-forms and phase-relationships illustrating the gradual-buildup control of Fig. 6, Fig. 8 is a simplified diagrammatic view of circuits and apparatus, illustrative of another example of the rapid broad-range rectifying-angle control for the grid-circuit of the firing-tube for one of the rectifier-ignitrons, distinguishing from Fig. 1 in showing a diagram in which there is a 60-degree delay in the firing of the charging-tube which charges the firing-capacitor, Fig. 9 is a diagram showing illustrative wave-forms and phase-relationships, illustrative of the firing-control equipment which is shown in Fig. 8, Fig. 10 is a view similar to Fig. 8, showing a modification using only a 30-degree delay of the firing of the charging-tube after the zero value of the charging-voltage, and Fig. 11 is a diagram showing exemplary wave-forms and phase-relationships illustrating the operation of the equipment shown in Fig. 10.

Fig. 1 shows an exemplary form of embodiment or application of my invention, in which a three-phase or other polyphase bus 13 supplies sixty-cycle energy, or other power frequency, to a group of twelve rectifier-ignitrons, numbered 1 to 12, which supply high-voltage direct-current energy, through a filter-reactor 14, to a direct-current power-line RA and RB, which energizes a load-equipment which may comprise any number of parallel-connected load-devices, such as L1 and L2, through individual ballast-resistances BR1 and BR2.

The load-devices L1 and L2, which are diagrammatically indicated by block-diagrams, are intended to be symbolic of any load-equipment which is subject to unpredictably occurring short-circuited conditions. In the actual circuit which is illustrated in Fig. 1, each of the load-devices L1 and L2 is the plate-circuit of a high-voltage high-vacuum radio-frequency oscillator-tube (not shown in detail). Such tubes are subject to "flash-arcs," which are high-current discharges of short-circuit magnitude, resulting from an unpredictable failure of the insulation which the tube normally provides between its main electrodes, as described in such publications as a paper by Dailey in Proc., National Electronics Conference, 1948, page 127; a paper by Bell et al. in J. I. E. E., vol. 83, 1938, page 176; a paper by Gossling in J. I. E. E., vol. 71, 1932, page 460; and a paper by Hansford et al. in J. I. E. E., vol. 65, 1927, page 308. Repeated "flash-arcs" of this nature cause gradual gas-evolution or a rise in gas-pressure within the tube, and a loss of emission. In order to protect such tubes, it is necessary to relieve them of their flash-arc currents within an extremely brief period of time, of the order of ten microseconds, or an even shorter period of time.

The rectifier-supplied direct-current buses RA and RB is protected by a primary or alternating-current circuit breaker 15, which is much too slow to protect a tube which develops a flash-arc.

As described and claimed in a companion-application of John L. Boyer and myself, Serial No. 332,036, filed January 19, 1953, I provide a suitable number of protector-ignitrons 1P to 4P which are connected to the power-line RA—RB, preferably at a point after the filter-reactor 14, that is, at a point directly across the positive and negative load-circuit buses RA and RB. In the form of embodiment shown in Fig. 1, two of the protector-ignitrons, 1P and 3P, are connected in parallel to each other, and the other two protector-ignitrons 2P and 4P are also connected in parallel to each other, and the two parallel-connected groups are connected in series, across the positive and negative wires PR1 and PR2, although it is to be understood that a single pair of parallel-connected protector-ignitrons could be used, if it had a voltage-rating sufficiently high to reliably withstand the high voltage which is applied thereto.

In accordance with my invention, the rectifier-assembly 1 to 12 may be any suitable assembly of power-tubes having a control-circuit means, of any type which requires to be suitably energized before each conducting-period of that power-tube, in accordance with the principles which will be described hereinafter. Because of the rugged nature of ignitrons, and their ability to withstand heavy short-circuit currents, these twelve power-tubes 1 to 12 are illustrated as sealed ignitrons, which have an anode 16, a pool-type cathode 17, one or more control-grids 18, an ignitor 19, and an exciting or holding-anode 20.

While the illustrated rectifier-equipment is not limited to any particular number of phases, it is illustrated as a twelve-phase system, consisting of two serially connected six-phase double-way rectifiers, each of which is equivalent to a three-phase full-wave rectifier, or a so-called three-phase bridge. The two six-phase double-way rectifiers are supplied from two power-transformers 21 and 22, having out-of-phase secondaries so as to produce line-to-neutral rectifier-phases according to a twelve-phase system, with the successive phases numbered 1 to 12, corresponding to the numbers of the rectifier-tubes. The first power-transformer 21 is illustrated as having a Y or star-connected primary 21P, a delta-connected tertiary 21T, and a delta-connected secondary winding 21S; while the other power-transformer 22 has delta-connected primary and secondary windings 22P and 22S. In rectifier-work, it is convenient to refer to the line-to-neutral secondary voltages, as if the secondary transformers 21S and 22S were star-connected, rather than being delta-connected (as in fact they could be), and these line-to-neutral or star secondary-voltages have accordingly been indicated in dotted construction-lines.

The primary windings 21P and 22P of the two power-transformers are energized, through alternating-current reactors 23, and through a primary circuit-breaker 15, from the bus 13. Polyphase current-transformers 24 are also provided, for responding to the total three-phase current which is supplied to the rectifier-assembly. The odd-numbered rectifier-tubes 1, 5, 9, and 7, 11, 3, are energized from the secondary winding 21S of the first power-transformer 21, with the supply-phase 1 being connected to the anode of tube 1 and the cathode of tube 7, while the supply-phase 5 is connected to the anode of tube 5 and the cathode of tube 11, and the supply-phase 9 is connected to the anode of tube 9 and the cathode of tube 3. The six even-numbered tubes 2, 6, 10, and 8, 12, 4, are energized in a similar manner from the secondary winding 22S of the second power-transformer 22.

It will thus be noted that there are four three-phase groups of rectifier-tubes, each of which acts as a three-phase rectifier-assembly, in which, as each tube ceases to conduct current, it commutates or transfers its current to the next lagging phase or rectifier-tube in that three-phase group. Thus, the three-phase group 1, 5, and 9 is positively energized from the secondary winding 21S, and it has its three cathodes connected to a common bus RP1 which is the positive output-bus of the entire rectifier-assembly. The three-phase rectifier-group 7, 11, and 3 is negatively connected to the same secondary winding 21S, and it has a common anode-connection RN1. The three rectifier-tubes 2, 6, and 10 are positively connected to the other secondary winding 22S, and these tubes have a common cathode-terminal RP2, which is serially connected to the common anode-terminal RN1 of the group 7, 11, and 3. Finally, the three rectifier-tubes 8, 12, and 4 are negatively connected to the secondary winding 22S, and they have a common anode-connection RN2 which serves as the negative output-lead of the entire rectifier-assembly.

The three-phase control-power for the various equipments is supplied from the bus 13 through a delta-delta excitation-transformer 25, which supplies power to an excitation-bus X, Y, Z.

The rectifier control-equipment for the rectifier-tube 1 is shown by way of example, and as being illustrative of the general nature of the equipments for the other rectifier-tubes. The circuits for the various grids, ignitors, and excitation-anodes of the several tubes, both rectifier-tubes and protector-tubes, are indicated by the letters G, I and A, respectively, followed by the tube-designations.

The grid-circuit G1 for the rectifier-tube 1 is provided with a grid-cathode capacitor 26, a grid-resistor 27, and the potentiometer 28 of a negative grid-bias source, which is diagrammatically indicated by means of a battery 29, although actually such bias-sources are usually in the form of rectifiers (not shown), energized from the excitation-bus X, Y, Z. As is conventional in high-voltage ignitron-circuits, the grid-circuit G1 may also include the secondary of a coupling-transformer 31, the primary of which is connected in the circuit A1 of the excitation-anode, so as to give the grid a positive impulse when the holding-anode or excitation-anode fires.

The excitation-anode circuit A1 of the rectifier-tube 1 is shown as including a current-limiting resistor 32, in addition to the primary winding of the grid-coupling transformer 31, and it is shown as being energized, through rectifiers 33, from two adjacent phases of an auxiliary excitation-bus SX, SY, SZ, which is energized, through an auxiliary delta-star transformer 34, from the main excitation-bus X, Y, Z.

The ignitor-circuit I1 for the rectifier-tube 1 is shown as being energized from an ignitor-coupling transformer 35 through a serially connected rectifier 36, the secondary circuit of the transformer being shunted by a rectifier 37 to provide a circuit for the reverse-currents which are induced in the secondary. The ignitor-coupling transformer 35 is energized by a capacitor-discharge circuit which includes a firing-capacitor 38, a sloping inductor 39, and a grid-controlled firing-tube FT1, the suffix 1 indicating that the firing-tube FT is for the rectifier-tube 1.

The firing-capacitor 38 is charged from a charging-transformer 41 which has a delta primary winding which is energized from the excitation-bus X, Y, Z. Thus, the negative terminal of the firing-capacitor 38 is connected to the star point of the six-phase star-connected secondary winding of the charging-transformer 41. The terminals of this six-phase secondary winding are connected to the charging-circuits C1 to C12 for the various rectifier-tubes 1 to 12, respectively. The charging-circuit C1 for the firing-capacitor 38 of the rectifier-tube 1 extends, through a current-limiting resistor 42, to the anode-circuit of a charging-tube CT1, the cathode of which is connected to the positive terminal of the firing-capacitor 38. The charging-tube CT1 is provided with a grid-circuit which is controlled by a grid-circuit transformer 43 which is energized from the excitation-circuit X, Y, Z through a switch AB1.

According to my present invention, the firing-tube FT1 is a grid-controlled tube or thyratron which is specially controlled in order to obtain very fast alteration of the rectifying angle of the rectifier-tube 1, to obtain a gradual initial voltage-buildup of the rectifier-assembly as a whole, and to obtain certain special features of arc-suppression in the rectifier-tube 1. The firing-tube FT1 has a grid-circuit FG1, which essentially contains a source 44 of substantially sine-wave firing-control voltage, a variable positive-bias source, such as a potentiometer 45 energized by a battery 46 through a switch AB2, and a rapidly adjustable negative-bias source, such as a potentiometer 47 energized by a battery 48 through a switch AB3. The negative-bias potentiometer 47 may be shunted by a ripple-smoothing capacitor 49, to make sure that the negative bias voltage is smooth, although this feature is not really necessary, especially when the bias-source is a battery 48, as shown. As a matter of fact, the negative-bias potentiometer 47 may supply either a negative bias or a positive bias to the grid-circuit FG1 of the firing-tube FT1, because this potentiometer is provided with two sliders, as shown, so that its polarity may be reversed.

The complete grid-circuit FG1 of the firing-tube FT1 may contain certain control-features other than the essential features just named. As shown in Fig. 1, this grid-circuit FG1 serially contains one phase of a sine-wave transformer-secondary 44, which is connected between the conductor FG1 and the conductor H1. The secondary phase, which is the sine-wave firing-control source for this grid-circuit FG1, is one phase of an open-star secondary-winding 44 of a sine-wave impulsing-transformer 51, which has a delta tertiary winding 51T and a star primary winding 51P which is energized from an auxiliary excitation-bus X′, Y′, Z′, which is connected to the main excitation-bus X, Y, Z through a switch AB4. The other secondary terminals of this transformer energizes the firing-tube grid-circuits for the other odd-numbered rectifier-tubes, as indicated. The corresponding sine-wave firing-control voltages for the firing-tube grid-circuits for the even-numbered rectifier-tubes are supplied by a sine-wave impulsing-transformer 52 having a delta primary 52P and an open-star six-phase secondary 52S.

Continuing the tracing of the firing-tube grid-circuit FG1 beyond the conductor H1 in Fig. 1, we come next to a ballast-resistor 53 which serves as a source of negative half-waves which are derived from a suitable secondary phase of a sine-wave impulsing-transformer 54, which is connected across the ballast-resistor 53 through a rectifier 55. The sine-wave impulsing-transformer 54 may be similar to the transformer 51 (except for a higher secondary voltage), having a star primary winding 54P, a delta tertiary winding 54T, and an open-star six-phase secondary winding 54S, which furnishes the negative half-sine waves for the firing-tube grid-circuits H1, H3, H5, H7, H9, H11, for the odd-numbered rectifier-tubes. Another negative-half-wave impulsing-transformer 56, similar to the transformer 52, is provided for the firing-control of the even-numbered rectifier-tubes. The negative-half-wave ballast-resistor 53, in Fig. 1, is connected between the conductor H1, and a firing-control conductor F1.

In accordance with my invention, the firing-control circuit F1 of Fig. 1 is used as the terminal of a special starting-circuit, which includes a timing-switch make-contact TSA which is connected between this circuit F1 and a control-circuit conductor 57. As a matter of fact, the corresponding firing-control circuits F2, F3, and F4, for the next three lagging-phase rectifier-tubes, 2, 3, and 4, respectively, are all connected to the firing-control circuit F1, so that all four of these consecutively numbered rectifier-tubes, 1 to 4, are fired simultaneously. These four rectifier-tubes are the minimum number of tubes which are necessary to establish a rectifier-circuit between the positive output-conductor RP1 and the negative output-conductor RN2, within the rectifier-assembly 1 to 12.

Later on, the rest of the rectifier-tubes will be fired, as will be subsequently described, and then, when the impressed voltage on the tube No. 1 declines, the current which was being carried by this tube will be commutated to the next lagging tube, No. 5, of the three-phase group 1, 5, and 9; and when the tube 2 of the next lagging phase, behind the tube 1, receives a declining voltage, which is lower than the voltage which is impressed upon the next lagging tube, No. 6, of that three-phase group, 2, 6, and 10, then the current which was being carried by the tube 2 commutes to the tube 6, and so on. At first, however, according to my invention, only the consecutively numbered tubes, 1, 2, 3, and 4 are initially fired.

As a matter of fact, provision is made, in Fig. 1, for initiating the energization of the direct-current power-line RA—RB, on the consecutively-numbered rectifier-tubes 1, 2, 3, and 4, the first time the power-line is energized, and the second time using the next four consecutively numbered rectifier-tubes, 5, 6, 7, and 8, by means of a timer-switch make-contact TSB, which connects the control-circuit conductor 57 to the firing-control conductors F5, F6, F7, and F8. When the power-line is again energized, for a third time, the last four rectifier-tubes, 9, 10, 11, and 12, are initially energized, through the medium of a time-switch make-contact TSC which is connected between the conductor 57 and the conductors F9 to F12. For subsequent energizations of the power-line, the cycle is repeated. The time-switches TSA, TSB, and TSC are a part of the electronic timer-control which will be explained in connection with Fig. 2.

The rectifier-firing control-circuit 57 is energized by the closure of a pulse-starting contact PS, which connects the circuit 57 to the slider of the positive-bias potentiometer 45, under the control of the electronic timer-control equipment of Fig. 2. As will be explained in connection with Fig. 2, the pulse-start contact PS remains closed for only some one or two milliseconds, or only long enough to initiate the firing of the four firing-tubes FT1, FT2, FT3, and FT4, or whichever other four firing-tubes are being controlled through one of the time-switch contacts TSA, TSB, or TSC.

The negative terminal of the positive-bias potentiometer 45 is indicated at 58, and this terminal is normally connected, through the make-contacts PA1 and PA2 of two correspondingly numbered relays PA1 and PA2, to a control-circuit conductor 59. In Fig. 1, the make-contacts PA1 and PA2 are shown in their open, or deenergized positions, but when the apparatus is operating, the operating-coils PA1 and PA2 of these relays are both energized, so that both of these make-contacts will be closed. This type of illustration is in accordance with the usual practice of illustrating all relays in their deenergized positions. The same relay-designation is applied to the operating-coil, and to all of the contacts, of any given relay, as a means of convenient identification, and to indicate the correlation of the parts. The energization of the relay-coils PA1 and PA2 will be subsequently described.

The control-circuit conductor 59 is connected, through a resistor 61, to a slider 62 on the previously described potentiometer 47, which can supply either a positive or a negative bias-voltage, according to its adjustment, although normally it would be adjusted to furnish a negative grid-biasing voltage. The conductor 59 is also permanently connected to all twelve of the firing-controlling conductors F1 to F12, through resistors 62A, 62B, and 62C, respectively.

As will be explained in connection with the electronic timer-control of Fig. 2, this control-apparatus is so equipped that, soon after the closure of the pulse-starting time-switch contact PS, and while the four first-energized rectifiers 1 to 4, or 5 to 8, or 9 to 12, as the case may be, are still firing, a so-called pulse-length contact PL is closed, which connects the control-circuit 58, through a rapidly variable resistance 63, to the positive terminal 64 of the negative-bias potentiometer 47, thus applying a positive bias to the control-circuit conductor 59, or at least making this conductor less negative (according to the adjustment), and thus applying a suitable positive or grid-firing voltage, through the resistors 62A, 62B and 62C, to the firing-circuit control-conductors F1 to F12 for all twelve of the rectifier-tubes. The time during which the pulse-length conductor PL remains closed determines the length of the pulse, or of the period of energization, which is applied to the power-line RA—RB.

The grid-biasing potentiometer 47 is provided with a second slider 65, which is connected to the negative terminal QN of an arc-suppression resistor 66. The positive terminal QP of the arc-suppression resistor 66 is connected to the negative terminal of the firing-capacitor 38, and to the cathode of the firing-tube FT1, and also to the common star-point of the secondary of the charging-transformer 41, which powers the charging-circuits C1 to C12 of all twelve of the charging-tubes CT1 to CT12, thus meaning that the QP conductors for the control-circuits of all twelve of the rectifier-tubes are connected together. These QP circuits are also all grounded, as indicated at 67.

The positive-terminal circuit QP of the arc-suppression resistor 66, in Fig. 1, is also connected to the cathodes of three arc-suppression thyratrons A, B, and C. The anodes of these three arc-suppression thyratrons A, B, and C are connected, through additional make-contacts PA1 and PA2 of the previously mentioned relays PA1 and PA2, and also through a back-contact 31X of a reset-relay 31X, to the slider 68 of a negative-bias potentiometer 69, which is powered through a battery 70. The negative terminal of this negative-bias potentiometer 69 is connected to the negative terminal QN of the arc-suppression resistor 66.

The operating coil of the reset-relay 31X is connected across the terminals QP and QN of said arc-suppression resistor 66. This 31X coil is also shunted by a resistor-capacitor time-delay circuit 72, which delays the dropout time of the relay. The reset relay 31X may be designed to pick up within some four or five cycles, or whatever other arc-suppression time may be required, for suppressing the arcs in the rectifier-tubes 1 to 12. When this reset relay 31X picks up, it opens its back-contact 31X in the plate-circuit 68 of the arc-suppression thyratrons A, B and C, thus removing the arc-suppressing negative bias from the resistor 66 in the grid-circuit of the firing-tube FT1. This also deenergizes the operating coil 31X of the reset relay, which permits this relay to drop out, in accordance with whatever dropout-time it has, thus reclosing its back-contact 31X and reconnecting the plate-circuits of the arc-suppression thyratrons A, B, and C, in readiness for another arc-suppressing operation.

An arc-suppressing operation is performed, for suppressing the arcs in the twelve rectifier-tubes 1 to 12, in the event of the application of a releasing grid-biasing potential to the grid-circuit of any one of the three arc-suppression thyratrons A, B, and C. The control-means for these arc-suppression grid-circuits will best be described after the rest of the apparatus of Fig. 1 has been described, and while the operation of the device is being described.

The control-circuits and connections for the protector-ignitrons 1P, 2P, 3P, and 4P will now be described. The cathodes of the protector-tubes 1P and 3P are connected together, in a circuit PR1, which is connected to the negative rectifier-output circuit RN2, and which is also connected to the negative power-line conductor RB. The common anode-circuits of these two protector-tubes 1P and 3P are serially connected to the common cathode-circuit PR0 of the other two protector-tubes 2P and 4P, and an impulse current-transformer 80 is connected in this series connection. The anodes of the second two protector-tubes 2P and 4P are connected together in a common circuit PR2, which is connected to the positive power-line conductor RA.

A simplified version of the control-circuit, apparatus and connections for the two parallel-connected protector-tubes 1P and 3P is shown in Fig. 1, in sufficient detail for an explanation of the operation, with the understanding that similar controls can be used for the other pair of protector-tubes 2P and 4P, or this second pair of protector-tubes may be omitted entirely, if each of the tubes 1P and 3P of the first pair is capable of withstanding the output-voltage of the rectifiers.

The ignitor-circuits I–1P and I–3P of the protector-ignitrons 1P and 3P are fired alternately, on alternate half-cycles of the 60-cycle rectifier-supplying circuit 13, by means of a conventional reactor-type firing-circuit, consisting of a feed-transformer 84, a linear reactor 85, a firing capacitor 86, a saturable reactor 87, and rectifiers 88 and 89.

The excitation-anode circuits A–1P and A–3P of these two protector-tubes 1P and 3P are each fed from two phases (90° apart, in the illustrated embodiment), of a four-phase star-connected secondary winding 91, through rectifiers 92. The transformer secondary 91 is energized from two primary windings 93 and 94 which are energized from an auxiliary four-wire excitation-bus PX, PY, PZ, PO, which is in turn energized from a delta-star transformer 95, which is in turn energized from the main excitation-bus X, Y, Z. The same auxiliary four-wire excitation-bus PX, PY, PZ, PO is also used to energize the feed-transformer 84 for the ignitor-circuits I–1P and I–3P.

The currents which are fed to the excitation-anode circuits A–1P and A–3P are limited, in each case, by two current-limiting resistors 96 and 97. Each of the resistors 96 is shunted by a small transformer 96′ and a capacitor 98, for energizing a lamp 99 for providing a visual indication when the corresponding excitation-anode is periodically conducting, during successive periods of somewhat more than a half-cycle each. The other current-limiting resistors 97 of the two excitation-anode circuits A–1P and A–3P are respectively shunted by transformers 101 and 102, the secondaries of which are connected so as to buck each other in an excitation-signal circuit having the terminals PR1 and PB1, which are used to energize an insulating transformer 103, which energizes the operating coil PA1 of the relay PA1, and which is also used in connection with the arc-suppression control which will be subsequently described. As long as the excitation anodes A–1P and A–3P are being successively energized, in proper fashion, so that an exciting-arc is always playing in at least one of the parallel-connected protector-tubes 1P and 3P, the insulating transformer 103 will be properly energized, so as to maintain the excitation of the relay PA1.

In case a second pair of protector-tubes, 2P and 4P is used, as illustrated, there will be other excitation-signal terminals PR0 and PB2, corresponding to the described terminals PR1 and PB1, for energizing and insulating transformer 104 which energizes the operating coil of the relay PA2.

The control-grid circuits G–1P and G–3P of the protector-tubes 1P and 3P are normally negatively biased by an amount sufficient to block or prevent these tubes from breaking down when subjected to the output-voltage of the rectifier-assembly, even when the excitation-anodes A–1P and A–3P are conducting. Each of the control-grid circuits G–1P and G–3P has a grid-to-cathode capacitor 105, and a series resistor 106, the latter being shunted by a capacitor 107.

The two grid-circuits G–1P and G–3P then continue, from a common conductor GP1, through a negative-bias branch, extending from said conductor GP1 to the common cathode-circuit PR1, through a current-limiting resistor 110 and a negative-bias potentiometer 111 which is energized from a battery 112. The common portions of the grid-circuits G–1P and G–3P also have a positive-bias branch, which extends from the common cathode-circuit PR1 through a positive-bias ballast-resistance 113, which is energized from a battery 114, and which is shunted by a capacitor 115. This capacitor 115 is charged by the positive-bias source 114, and it cooperates with the capacitors 107 which shunt the grid-resistors 106, so as to cause high initial grid-currents, which facilitate extremely rapid release of the protector-tubes 1P and 3P, in a matter of a few microseconds. The capacitors 107 which shunt the grid-resistors 106, provide high initial grid-currents for a few microseconds in the grid-circuits G–1P and G–3P, for releasing the protector-tubes 1P and 3P, while the grid-cathode capacitors 105 serve to prevent release by shock-over, or sudden application of anode-to-cathode voltages. These grid-cathode capacitors 105 should be as small as possible, in order that they will not prevent a high speed of release of the protector-tubes 1P and 3P, respectively.

From the positive-bias ballast-resistor 113, the positive-bias branch continues through a back-contact RR of a reset-relay RR, and then through a grid-release thyratron GR to the common grid-circuit conductor GP1 for the two grid-circuits G–1P and G–3P of the protector-tubes 1P and 3P.

The grid-release thyratron GR has shield and control grids which are connected, in parallel, to a common grid-circuit 120, which has a grid-cathode capacitor 121, a grid-resistor 122, a control-pulse insulating-transformer 123, and a negative-bias potentiometer 124 which is energized from a battery 125. The secondary winding of the control-pulse insulating-transformer 123, which is included in the grid-circuit 120 of the grid-release tube GR, is shunted by a resistor 126.

The reset-relay RR is provided with an operating-coil RR which is connected across the current-limiting resistor 110 through a resistor 127. If necessary, the operating-coil RR of the reset relay may be shunted by a capacitor 128 in order to secure a delay dropout-operation.

As described and claimed in the companion application of Boyer and myself, I provide a high-speed fault-detection means. In Fig. 1, a separate fault-detection means is associated with each of the ballast or buffer-resistors BR1 and BR2, which are connected in series with the respective loads L1 and L2. As shown, the negative terminals of the buffer-resistors BR1 and BR2 are each connected to the cathode of its own detector-thyratron D1 and D2, as the case may be. The grids of these detector-thyratrons D1 and D2 are provided with grid-resistors GR1 and GR2, respectively, which are connected to the bus RA through a common negative-bias potentiometer 130, which is shunted by a filter-capacitor 131, and energized by a battery 132. The grid-circuit of each of the detector-thyratrons D1 and D2 receives a positive signal across its associated buffer-resistance BR1 or BR2, as the case may be, when a load-current flows through that resistor.

In the event of a fault in one of the load-circuits L1 or L2, the voltage which is developed across the corresponding bias-resistor BR1 or BR2 becomes much greater than the negative bias of the potentiometer 130, causing a rapid release of the grid of the associated detector-thyratron D1 or D2. The speed of this grid-release is increased by having the grid-resistors GR1 and GR2 each shunted by a capacitor 133. The grid-circuits of the detector-thyratrons D1 and D2 have grid-to-cathode capacitors 134, which protect the thyratrons against shock-over, or erroneous impulse-responsive firing as a result of sudden voltage-applications, but these grid-cathode capacitors 134 should be as small as possible in order to have a high rate of release of the detector-thyratrons D1 and D2 in response to a fault in the associated load L1 or L2.

The anodes of the two detector-thyratrons D1 and D2 are connected to a common anode-circuit CQN, which serves as the negative terminal of a detector-pulse control-circuit, the positive terminal of which is designated as CQP. This positive control-circuit conductor CQP is connected to the positive power-line conductor RA through a positively charged capacitor 135, which is charged from a high-voltage source, such as a battery 136, through a large resistance 137. When there is a fault in one of the loads L1 or L2, the voltage across its ballast-resistance BR1 or BR2 assists the voltage of the positively charged capacitor 135, and at the same time fires the corresponding detector-thyratron D1 or D2, so that the positively charged capacitor 135 is discharged, giving a fault-indicating control-pulse in the circuit CQP and CQN.

The detector-pulse control-circuit CQP and CQN is used to energize an insulating transformer 141, having secondary terminals PR1 and PS1, which energize the control-pulse insulating-transformer 123 in the grid-circuit of the grid-release tube GR. When the second pair of parallel-connected protector-tubes 2P and 4P is used, as illustrated, the detector-pulse control-circuit CQP and CQN will also energize a second insulating-transformer 142, having secondary terminals PR0 and PS2 for performing a similar service for the protector-tubes 2P and 4P.

Attention will now be directed to the grid-control circuits for the various arc-quenching tubes A, B, and C which are shown at the bottom of Fig. 1.

The left-hand arc-quenching tube B, as shown in Fig. 1, involves a novel overcurrent-control in accordance with my present invention. This overcurrent-control is obtained from the three-phase supply-line current-transformers 24, through a rectifier-bank 143, which provides a rectified output from said current-transformers, for energizing a current-transformer control-circuit CTP and CTN, which in turn energizes a grid-circuit potentiometer 144, having a slider 145 which is connected to the control-grid of the arc-quench tube B. The negative terminal CTN of the potentiometer 144 is connected to a negative-bias potentiometer 146 for the grid-circuit of said tube B, this negative-bias potentiometer being energized from a battery 147. Thus, when the polyphase supply-current becomes sufficiently large, as under fault-conditions, the supply-line current-transformers 24 apply a sufficiently positive voltage to the circuit CTP to release the slider 145, and hence the grid of the arc-quench tube B, thus firing this tube and applying the negative bias of the potentiometer 69 to the common circuit-portion QN of all of the grid-circuits of the firing-tubes, such as FT1, thus preventing any subsequent firing of any of the rectifiers 1 to 12 as long as the plate-circuit of said tube B remains connected to the potentiometer 69.

As described and claimed in the companion application of Boyer and myself, the arc-quenching tubes C and A are controlled in various manners dependent upon the operation and control of the protector-tubes 1P to 4P.

The arc-quench tube C is released in the event of the loss of an excitation-arc in one or both of the parallel-connected protector-tubes 1P and 3P, and, if the second pair of protector-tubes 2P and 4P are used, then also in the event of the loss of an excitation-arc in both of the parallel-connected protector-tubes 2P and 4P. As previously explained, these excitation-arcs are needed, in the protector-tubes 1P to 4P, in order that load-fault protection may be available, that is, in order that the protector-tubes 1P to 4P may stand in instant readiness to be fired, by the release of their grids, in the event of a short-circuited condition on either one of the load-devices L1 or L2. As previously explained, this fault-protection availability is indicated by the presence of a continuing voltage-signal in both pairs of control-lines PR1—PB1 and PR0—PB2, which energize the respective insulating-transformers 103 and 104. These voltage-signals, which appear in the secondary circuits of the insulating transformers 103 and 104, are rectified by rectifier-bridges 153 and 154, respectively, filtered by inductors 155 and capacitors 156, and impressed on potentiometers 163 and 164, respectively, to provide negative bias in the grid-circuit of the arc-quenching thyratron C. This grid-circuit is also provided with a positive bias-voltage through a potentiometer 165 which is energized from a battery 166.

The arc-quench thyratron A has its grid-circuit controlled so as to be responsive to a fault-detection signal, or to the releasing or the firing of suitable protector-tubes 1P to 4P. By way of example, two alternative grid-firing means are used in the grid-circuit of the arc-quenching thyratron A, one grid-firing means being used as a safeguard for the other, so that the tube A may be fired by the quickest possible means, in the event of a short-circuited condition on one of the load-devices L1 or L2, or in the event of the releasing of the grids of the protector-tubes 1P to 4P, or in the event of the establishment of a load-shorting circuit through the bank of protector-tubes 1P to 4P. The fault-detector controlling-circuit pulse is taken from the previously described control-circuits CQP and CQN, and applied, through an insulating transformer 167, to a positive-bias potentiometer 168 in the grid-circuit of the arc-quenching thyratron A. In addition, the flow of a load-protecting short-circuiting current through the bank of protector-ignitrons 1P to 4P is detected by the previously described, serially connected impulse-transformer 80, which energizes a control-circuit JQP and JQN, which in turn energizes a positive-bias potentiometer 169 in the grid-circuit of the arc-quench tube A. This grid-circuit is also provided with a suitable negative biasing-voltage, through a potentiometer 170 which is energized from the battery 171.

My invention is generally applicable to any rectifier-installation in which a quick control of the rectifying angle is controlled by quick changes in the grid-bias in a grid-circuit which contains a substantially sinusoidal grid-firing voltage. The particular embodiment of my invention which is illustrated in Fig. 1 relates to a system in which the rectifier-tubes 1 to 12 are electronically controlled by a timer which produces a succession of short impulses, each having a duration of anything up to seventy-five milliseconds, or 4.5 cycles of the 60-cycle supply, at a pulse-rate of anywhere from one to eight pulses a second, by way of example.

The electronic control-equipment is indicated by a block diagram in Fig. 1, and a simplified diagrammatic showing of this electronic equipment is given in Fig. 2. Some of the features of the electronic timer-control which is shown in Fig. 2 were invented by R. B. Squires and J. B. Brittain.

The timing for the electronic control-circuits, as shown in Fig. 2, is synchronized with the 60-cycle rectifier-supply voltage by means of a three-phase bank of peaking-transformers 172, which are energized from the excitation-bus X, Y, Z of Fig. 1, and which in turn supply a succession of positive and negative peaks to three secondary-circuits SA, SB, and SC, each of which contains a resistor 173, and the correspondingly lettered time-switch make-contact TSA, TSB, or TSC, as the case may be. The three secondary circuits SA, SB, and SC are then combined into a single circuit at 174, which is continued on, through a resistor 175, a conductor 176, and a resistor 177 to ground. The conductor 176 is connected, through a resistor 178 to a synchronizing-signal bus SS, from which the electronic timer-control apparatus derives its initial controlling-impulses.

An arrangement is made, whereby the synchronizing-signal bus SS may be short-circuited in the event of conditions requiring arc-suppression in the rectifier-tubes 1 to 12 of Fig. 1. In the event of an arc-suppression operation, the reset-relay 31X of Fig. 1 is energized, and closes a make-contact 180, which short-circuits the synchronizing-signal bus SS, as indicated in both Fig. 1 and Fig. 2. The synchronizing-signal bus SS may also be shorted by a manually controlled switch 181, as shown in Fig. 2, or by a make-contact RPa of a relay of the same designation, which will be subsequently described.

The electronic timer-control apparatus of Fig. 2 comprises two time-base equipments, comprising tubes T2 to T5 and T2' to T5', respectively, operating under the control of the synchronizing-signal bus SS, and serving to produce, respectively, a long and a short saw-tooth wave, in output-circuits marked STL and STS, respectively. These saw-tooth waves are used to energize a group of electronic devices, or so-called electronic switches, whose contacts can be made to close and open, or open and close, at definite times, and for definite intervals, on a repetitive basis.

The various tubes of the electronic equipment of Fig. 2 have their plate-circuits energized from a bus marked +250, while some of their cathode-circuits are connected to a grounded bus marked GND. The plate-circuit supply is obtained from a very accurately controlled voltage, which is simply indicated, in Fig. 2, as a plate-battery 182, although an elaborately controlled plate-voltage source is actually used, the details of which are not necessary to an understanding of the present invention. Some of the grid-circuits of the tubes shown in Fig. 2 are biased from an accurately controlled grid-bias bus, marked −150, which is energized from an accurately controlled voltage-source, which is diagrammatically indicated by means of a bias-battery 183 in Fig. 2.

The long-period time-base equipment T2 to T5 of Fig. 2 has a pentode T2, whose control-grid (or simply grid) is controlled through a voltage-divider 184, 185, and 186, which is connected between the synchronizing-signal bus SS and the grid-bias bus −150. The last element 186 of this voltage-divider is preferably a potentiometer, for the purpose of varying the amplitude of the negative signal which appears at the plate of the pentode T2, as will be subsequently described. The suppressor of the pentode T2 is connected to the cathode, and the screen is connected to the plate-supply bus +250 through a resistor 187. The plate of this pentode is connected to the plate-supply bus +250 through a plate-resistor 188.

The pentode T2 is normally biased to cutoff. If a sufficiently large positive synchronizing-signal is applied from the sixty-cycle peaking-transformer 172 to the grid of this tube, the tube becomes conducting and a corresponding negative signal appears at the plate, due to the voltage-drop in the plate-resistor 188. If a negative signal is applied to the grid, the tube still remains in its cut-off condition. Hence, this tube operates to produce a negative peak, or a voltage-dip signal, at its anode, with an amplitude which is variable by the potentiometer 186.

During the normal cutoff condition of the pentode T2, its plate-voltage is +250 volts, the same as the plate-voltage bus +250. This plate-voltage of the pentode T2 is applied, through a voltage-divider 190, 191, which applies a normal voltage of, say, +150 volts to the first grid of a double-triode cathode-follower tube T3. Hence, the cathode of the cathode-follower tube T3 is normally held at +150 volts, of which about 3 volts appears across a cathode-resistor 192, and about 147 volts appears across a serially connected cathode-capacitor 193, the latter being shunted by a high resistance 194.

If, now, a negative signal appears on the plate of the pentode T2, this attenuated and applied, as a negative pip, to the first grid of the cathode-follower T3, through the voltage-divider 190, 191. This causes a corresponding drop in the cathode-voltage of the cathode-follower tube T3. However, the cathode-capacitor 193 is charged to about 147 volts, and hence the cathode-voltage cannot instantly drop below this value of about 147 volts. Hence, the cathode-drop is limited to a fixed value of about three volts, which is the proper amount for triggering the following stage of the equipment. It is to be noted that this negative trigger of about three volts is independent of the magnitude of the signal which is given by the sixty-cycle peaking-transformer 172.

The second section of the cathode-follower tube T3 is connected as a diode, that is, with its grid connected to its plate. The two cathodes of this tube are connected together, so that the second plate of the tube is normally at +150 volts, corresponding to the normal cathode-voltage. This plate-voltage is tied to the plate of the next tube T4.

This tube T4 is a pentode, which is connected as a phanastron sweep-generator of a type which is similar, in principle, to that which is discussed in the M. I. T. Radiation Laboratory Series, vol. 19, pages 195–204. The plate of the phanastron tube T4 is connected to the plate-voltage bus +250 through a plate-resistor 195. The cathode is connected to the grounded bus GND. The sceen is connected to the plate-voltage bus +250 through a resistor 196. The suppressor-circuit 197 is connected to the screen through a resistor 198. The suppressor-circuit 197 is also connected to the negative bus −150 through a variable resistor 199.

The plate of the phanastron tube T4 is connected to the first grid of a double-triode cathode-follower tube T5. The first cathode of this cathode-follower tube T5 is connected to the grounded bus GND through a cathode-resistance 204, and it is connected to the grid of the phanastron tube T4 through a timing-capacitor 205. The grid of the phanastron tube T4 is connected to the suppressor-circuit 197 of this tube through a high-resistance circuit consisting of a resistor 206, a conductor 207, and a resistor 208. The conductor 207 is connected to the slider of a potentiometer 209 which is connected between the positive bus +250 and the grounded bus GND, and which normally holds the phanastron grid slightly positive with respect to the cathode, which is at ground potential. The grid is about 80 volts positive with respect to the suppressor-circuit 197, but negative with respect to the first cathode of the cathode-follower tube T5, so that the timing-capacitor 205 is normally charged to a value which may be about 150 volts, so as to present its negative terminal to the phanastron grid.

The suppressor-circuit 197 of the phanastron sweep-generator T4 is normally set so as to cut off the plate-current, so that the screen gets all of the current, and hence the screen-voltage is depressed by the voltage-drop in the screen-resistor 196. When the three-volt negative pulse appears on the cathode of the preceding cathode-follower tube T3, it is transferred to the plate of the phanastron T4 through the diode section of the preceding cathode-follower tube T3. This causes the plate-voltage of the phanastron T4 to fall, and also the grid-voltage of the first section of the tube T5. The corresponding cathode of this tube T5 also falls, by cathode-follower action. Since the timing-capacitor 205 cannot discharge immediately, the drop in potential is transferred to the grid of the phanastron T4. This reduces the amount of current drawn by the screen of the phanastron, and hence the screen-voltage rises. There is a regenerative action, because the screen is tied to the suppressor through the resistor 198, so that the suppressor-voltage also rises. This causes a plate-current to flow in the phanastron T4, which further reduces the plate-voltage because of the voltage-drop in the plate-resistor 195.

This regenerative action continues, in the phanastron tube T4, until the plate-voltage drops very rapidly by a certain fixed amount of about five volts, in the illustrative example. The phanastron has now been triggered, and it subsequently operates according to its own law of action, until it resets itself, meanwhile being unaffected by any further triggering signals, because of the action of the diode section of the tube T3, until the completion of its resetting operation, which will be subsequently described.

At this time, the five-volt drop in the plate-voltage of the phanastron T4 is communicated to the first grid, and hence to the first cathode, of the cathode-follower tube T5. Since the charge on the timing-capacitor 205 cannot change instantly, this also causes a depression in the grid-voltage of the phanastron T4. This grid-voltage depression is sufficient to carry the phanastron-grid negative, with respect to the suppressor-circuit 197 so that grid-current no longer flows, and the total plate and screen current is very low.

The timing-capacitor 205 now begins to discharge through the high resistance 206, which serves as a timing-resistor for the timing-capacitor 205. As the timing-capacitor 205 gradually discharges, the grid-voltage of the phanastron rises linearly with time, and the plate-voltage of the phanastron linearly falls. As this plate-voltage of the phanastron falls, the first cathode-voltage of the cathode-follower tube T5 also falls, following the phanastron plate-voltage. Since the first cathode of the cathode-follower tube T5 is tied to the phanastron-grid through the timing-capacitor 205, it keeps the grid-voltage of the phanastron T4 from rising too rapidly. This feedback is such that the timing-capacitor 205 discharges linearly.

The above-described discharging-action of the timing-capacitor 205, accompanied by a voltage-reduction on the first cathode of the cathode-follower tube T5, continues until the phanastron plate-voltage can go no lower. When this happens, the first cathode of the cathode-follower tube T5 can no longer hold the phanastron grid-voltage down. The phanastron grid-voltage then rises, increasing the total current drawn by the phanastron, but the phanastron-plate can draw no more current, and hence the phanastron-screen takes the increased current. This causes the screen-voltage of the phanastron T4 to fall, because of the voltage-drop in the screen-resistor 196, and this in turn causes the suppressor-voltage to fall and to cut off the plate-current. The plate-voltage then immediately rises to its initial value of +150 volts, at which point it is held by the diode half of the preceding cathode-follower tube T3. This action takes place very rapidly, and results in a very rapid resetting of the entire system consisting of the tubes T2 to T5, holding the system in readiness to wait for the next synchronizing-signal to repeat the process.

The high speed of resetting of the sweep-circuit generator T2 to T5 is brought about by the rapid recharging of the timing-capacitor 205 through the first section of the cathode-follower tube T5. Without this section, the timing-capacitor 205 would have had to recharge through the rather large plate-resistor 195 of the phanastron tube T4, and hence the retrace or the reset-curve of the saw-tooth voltage would be very slow.

The second section of the cathode-follower tube T5 is also connected as a cathode follower, with its grid connected to the first cathode of this tube. Thus, the second cathode of the cathode-follower tube T5 is directly connected to the long-period saw-tooth output-circuit STL, and it is also connected to ground through a cathode-resistance 216. The second section of the cathode-follower tube T5 thus serves to isolate the output from the sweep-circuit, and it also provides a low-impedance source for the output-circuit STL.

The long-pulse saw-tooth generator, or sweep-generator, consisting of the tubes T2 to T5, with the output-circuit STL, has its circuit-constants adjusted, in the illustrated example, for a saw-tooth length or timing period of one second, or sixty cycles of a 60-cycle system.

There is also a second saw-tooth generator, or sweep-generator, consisting of the tubes T2', T3', T4', and T5', and having a short-time saw-tooth output-circuit STS, in which the timing capacitor 205' is of a different size, and also some of the resistances are different, so that this second generator is set for a short time-base or saw-tooth-length of 75 milliseconds, or 4.5 cycles of a 60-cycle system.

It is desired that, when the operation is first started, the two time-base sweep-generators shall start simultaneously, in response to the same impulse from the sixty-cycle peaking transformer 172, as received on the synchronizing-signal bus SS.

It is also desired that, when the short-time-base sweep-generator T2' to T5' resets itself, it will wait until the long-time-base sweep-generator T2 to T5 resets itself. To this end, it is arranged that the long-wave generator T2 to T5, when it first begins its down-sweeping voltage which constitutes the saw-tooth wave, shall operate a contact which will short-circuit the synchronous-wave bus SS, as indicated by the relay-contact RPa, which will be subsequently described.

It is further desirable to be able to change the length of the long saw-tooth-wave which is generated by the long-time-base generator T2 to T5, so that the pulse-repetitions do not need to occur at the rate of one per second, but may occur at shorter time-intervals, down to intervals of, say, one-eighth of a second. To this end, the long-period saw-tooth generator T2 to T5 is provided with a circuit 218 which connects the phanastron suppressor-circuit 197 to the negative bus −150 through a relay make-contact RPb, which will be subsequently described.

In other respects, the two sweep-generators T2–T5 and T2'–T5' are similar, so that a description of one will suffice for both.

Fig. 2 also shows simplified representations of certain electronic switches which are operated or controlled by the two saw-tooth wave-circuits STL and STS. Each electronic switch could consist of simply a tube or tubes, the conductive operation of which would correspond to a switch or relay contact-closing operation, while the blocking of the tube or tubes would correspond to a contact-opening operation. However, in the actual application of my invention which has been chosen for illustration in Figs. 1 and 2, the various electronic switches consist of very fast, tiny, electronically controlled, electromagnetically operated relays, for example, relays having tiny mercury-switch contacts, which have been schematically indicated as ordinary relay-contacts, as it is theoretically possible to use any kind of relay-contact which can be closed and opened with sufficient rapidity, perhaps something like three or four milliseconds, or less, if possible. By way of contrast, it may be noted that these electronic switch-operating times are something like 500 times longer than the few microseconds which are required to short-circuit the direct-current power-line RA—RB by means of the grid-controlled protector-thyratrons 1P to 4P in Fig. 1.

Since all of the electronic switches in Fig. 2 are alike, except for their potentiometer-adjustments, and with other exceptions which will be noted, a description of one will suffice for all.

The long-base time-wave circuit STL controls two electronically operated repetition-period control-switches, having electromagnetically controlled relays which are marked RPa and RPb, respectively. Each of these electronic relays has its own double-triode cathode-follower tube T, having the two cathodes connected together, and connected to the negative bus −150 through a cathode-resistor 220. The first anode of each of these tubes T is directly connected to the positive bus +250 while the second anode is connected to said positive bus through the operating coil RPa or RPb of its associated electromagnetically operated repetition-period relay, as the case may be.

The first grid of each of these two long-base-control tubes T of these electronic switches RPa and RPb is connected to the long-base control-circuit STL. The second grid of each of these tubes is connected, through a grid-resistor 221, to an adjustable point on its own potentiometer 222, which determines the voltage-point, on the saw-tooth input-wave, at which the tube will become conductive, so as to energize its associated relay-coil. The potentiometers 222 of the two electric switches which are controlled by the long-base saw-tooth circuit STL are energized from potentiometer-buses HP11 and HP12, which are respectively connected to the positive bus +250 and to the grounded bus GND, through separately adjustable resistors 231 and 232, respectively.

The tube T of each electronic switch starts with its first grid, and hence its cathodes, at the initial or highest value of the saw-tooth sweep. As the saw-tooth voltage drops, the cathode-voltage drops with it. Nothing happens until the cathodes drop to a voltage which is approximately the same as the potentiometer-setting of the second grid, at which point the second plate begins to carry current, thus energizing the associated electromagnetically operated relay-coil, such as RPa and RPb, as the case may be.

When the sweep-voltage reaches its lowermost value and resets, the second plate-current of the tube T cuts off very rapidly, so rapidly that a high voltage is induced off in the coil of the relay. To retard the decay of current and reduce this induced voltage to a reasonable value, it is usually desirable to connect the second plate of each tube T to the grounded bus GND through a small damping-capacitor 233 and a damping-resistor 234.

The output of the second time-base equipment T2' to T5' is arranged so that the short-base saw-tooth control-circuit STS controls five electronic switches, which are arranged, in Fig. 2, in the chronological order of their operation. In this case, the potentiometers 222 of these five switches are energized from their own potentiometer-buses HP1, HP2, which are excited by separately adjustable resistors 241 and 242, similar to the adjustable resistors 231 and 232 for the long-base potentiometer-buses HP11 and HP12.

In the order of their operation, the five short-base electronic switches consist of two pulse-start switches PSa and PSb, a first pulse-length switch PLa, a so-called bias-control switch BC, and a second pulse-length switch PLb. In each case, the designation which is used for the electromagnetically operated relay-part of the electronic switch is also used as the name to designate the entire electronic switch. The bias-control designation BC is a misnomer, so far as is shown in the very much simplified diagram of Fig. 2, arising from the fact that certain other functions, not here shown, and not necessary to an understanding of the present invention, are also performed by the bias-control switch BC in the actual apparatus in which the present invention was used.

The pulse-start relay PSa of Fig. 2 has a make-contact, which is also designated as PSa. The other pulse-start relay PSb has a back-contact, designated PSb. These two contacts are connected in series with each other so that a circuit is made under the control of the a contact and broken under the control of the b contact. Together, the two pulse-start relay-contacts PSa and PSb perform the function which is represented, in Fig. 1, by a single pulse-starting contact PS.

In like manner, the two pulse-length relays PLa and PLb, in Fig. 2, have serially connected make and break contacts, PLa and PLb, respectively, for performing the function which is designated simply as a pulse-length contact PL in Fig. 1.

In the case of the electronic switches PSb and PLb, which have back-contacts in series with make-contacts of switches PSa and PLa, respectively, in Fig. 2, it is desired to slightly delay the drop-out time of these switches. During the resetting instant, when the saw-teeth wave is resetting itself, it is desired that the b contact should not reclose as a result of the deenergization of the b relay, before the a contact reopens as a result of the deenergization of the a relay. In this way, we avoid the momentary reclosure of the circuit containing the serially connected contacts a and b, when the corresponding relays a and b are simultaneously deenergized. To this end, it is desirable to provide the electronic switches PSb and PLb, in Fig. 2, with an additional time-delaying circuit whereby the second plate of the tube T is connected, through a resistor 243, to the slider of a potentiometer 244 which is energized between the buses +250 and GND. This time-delaying circuit cooperates with the damping-capacitor 233 to delay the drop-out times of the b relays PSb and PLb very slightly, such as by a matter of some three or four milliseconds.

The electronic timer-control equipment of Fig. 2 also includes three time-switch relays TSA, TSB, and TSC, and three auxiliary time-switch relays TSA1, TSB1, and TSC1, which are energized from a direct-current stationbus, which is indicated at (+) and (−). These time-switch relays can be put into service by the closure of a manually operated positive-circuit switch 249, which energizes an auxiliary positive bus 251.

After the closure of the bus-switch 249, the operation of the various time-switches from TSA to TSC1 is first started off by the closure of the electronic bias-control relay-contact BC. This BC-contact energizes a circuit 252 from the auxiliary positive bus 251, and this circuit continues, through a back-contact 253 of the second time-switch relay TSB, a circuit 254, and a back-contact 255 of the first time-switch relay TSA, to a circuit 256 which energizes the positive terminal of the operating coil TSA1, the negative terminal of which is connected to the negative bus (−). The auxiliary time-switch relay TSA1 immediately picks up and closes its make-contact which connects the negative terminal of the coil TSA to the circuit 256. The positive terminal of the coil TSA was already connected to the auxiliary positive bus 251, through the back-contact 257 of the second time-switch relay TSB.

However, the TSA coil is not immediately energized, because it is short-circuited by the circuit containing the contacts BC, 253 and 255. Hence, during the very first pulse of the electronic timing equipment of Fig. 2, the time-switches TSA, TSB, and TSC do not come into play, remaining deenergized. However, on all subsequent pulses of the electronic timing equipment, the time-switches TSA, TSB, and TSC successively come into play, as will now be described.

At the end of the first short-period saw-tooth wave, the BC electronic switch is deenergized, thereby opening its make-contact BC in the circuit between the auxiliary positive bus 251 and the conductor 252. This removes the short-circuit from across the operating coil TSA, so that the two operating coils TSA and TSA1 are now connected in series, in a circuit containing the TSB back-contact 257. This energizes the first time-switch TSA, opening its back-contact 255, and closing its various make-contacts. In this way, the time-switch make-contact TSA, which is shown in Fig. 1, is closed, so as to make a connection between the circuits 57 and F1 of Fig. 1.

Ordinarily, the electronic timing-equipment of Fig. 2 is put into operation, as by the closure of the positive-bus switch 249, for some two seconds (or more) prior to the activation of the rectifier-tubes 1 to 12, as by the closure of the control-circuit switches AB1 to AB4. This allows time for the various tube-filaments to heat up, time for the first time-circuit pulse to have passed, and time for other functions that need not be here described.

Let us assume, now, that the rectifier control-circuits are energized, and that the first time-circuit pulse, which thereafter activates the rectifier-tubes 1 to 12, occurs at a time when the time-switch TSA is already in its energized condition. The end of the preceding long-base pulse of the saw-tooth control-circuit STL has deenergized the repetition-period switch RPa, thus removing the RPa short-circuit from the synchronizing-signal bus SS, as will be more fully described after the description of the circuit-connections has been completed. The energized time-switch TSA will have its top contact TSA closed, in the peaking-transformer secondary-circuit SA at the top of Fig. 2, thereby selecting phase A of the supply-circuit as the phase for supplying a synchronizing-pulse to the electronic timing-equipment of Fig. 2.

When this phase-A synchronizing-pulse comes, the short-base saw-tooth wave commences another downward sweep, and the electronic switch BC is again energized, at a certain point in this sweep, but only after a power-voltage pulse has been started in the power-line RA—RB of Fig. 1, as will be subsequently described.

Continuing my description of the time-switch control-equipment near the bottom of Fig. 2, it will be noted that this closure of the BC switch-contact again energizes the circuit 252—253—254, and this circuit is now continued through a TSA make-contact 258, which energizes the operating coil TSB1 of the auxiliary time-switch TSB1, which in turn completes a circuit to the TSB coil, in a manner similar to that in which the TSA1 relay completed a circuit to the TSA coil, the circuit of this TSB coil being completed through a TSC back-contact 259. The TSB coil is at first short-circuited by the circuit containing the switch-contact BC, so that the TSB coil does not become energized until the end of the short-period saw-tooth pulse which has been holding the electronic switch BC closed. The TSB coil is thereupon energized, and its back-contact 257 deenergizes the TSA coil, so that the first time-switch TSA is now deenergized, and the second time-switch TSB now stands energized, in readiness for the next power-pulse. The energization of the second time-switch TSB also opens its back-contact 253. The TSB switch also closes a make-contact 261 which connects the positive terminal of the coil TSC1 to the circuit 252 in readiness for the next operation of the electronic switch BC.

The next saw-tooth pulse of the electronic equipment starts a power-voltage pulse under the control of the time-switch TSB, and after this power-pulse has been started, the electronic switch BC again closes, and energizes the operating coil of the auxiliary time-switch relay TSC1 through the TSB make-contact 261. The closure of the auxiliary relay TSC1 establishes a circuit for the TSC coil, which contains a back-contact 262 of the first time-switch relay TSA, but this TSC coil is at first short-circuited by the circuit containing the BC contact, that is, before the BC contact opens. When the BC contact opens, at the end of the short-base saw-tooth pulse, the time-switch relay TSC is energized, thereby conditioning the circuits for the beginning of the next voltage-pulse on the power-line RA—RB of Fig. 1. The closure of the relay TSC opens its back-contact 259, which deenergizes the coil of the time-switch relay TSB, and the time-switch relay TSB, upon deenergization, recloses its back-contacts 253 and 257, and reopens its make-contact 261, thereby resetting the time-switch control-circuits of Fig. 2, in readiness for a repetition of the operation.

Thus, after the time-switch TSC has controlled the initiation of another power-voltage pulse on the power-circuit of Fig. 1, the electronic switch BC again closes, while the power-pulse is still in progress, and this time, the BC contact energizes the auxiliary time-switch relay TSA1, through the circuit 252—253—254—255—256. This auxiliary relay TSA1 again picks up, but again nothing happens until after the opening of the electronic switch BC, at which time the first time-switch TSA is again energized, and by opening its back-contact 262 it deenergizes the third time-switch relay TSC, thereby conditioning the time-switch circuits for another power-pulse, in which the time-switch TSA will be in control at the moment of starting of the power-pulse.

Before starting a description of the operation of the apparatus shown in Fig. 1, it will be helpful to make a brief reference to the operation of the electronic circuits of Fig. 2, with the aid of the time-curves which are shown in Fig. 3.

At the beginning of the operation, the voltages of the saw-tooth output-circuits STL and STS of both the long-period and short-period time-base equipments in Fig. 2 are at their maximum value of +150 volts, as indicated in Fig. 3. At a moment 270 indicated by the first synchronizing signal SS–A, in Fig. 3, both saw-tooth waves are triggered off, so that the voltage quickly drops to 145 volts, as indicated by the point 271 in Fig. 3. After this, the two saw-tooth voltage-waves continue to fall, at different slopes, as indicated by the slanting lines marked STS and STL in Fig. 3. The short-time saw-tooth wave STS completes its downward sweep, to its lowermost voltage, which may be 100 volts, as marked, in a time of .075 second, or 4.5 cycles of a 60-cycle system, until the point 272 is reached, at which time the short-base saw-tooth voltage practically instantly rises to its initial value of +150 volts, as indicated at 273.

Meanwhile, the long-base saw-tooth wave STL, starting from the same point 271, continues its more gradual downward sweep, and, if it were uninterrupted by the second repetition-period switch RPb, it would continue on to its lowermost voltage, such as 100 volts, at the point 274, in a time-period which is indicated as one second or sixty cycles of a 60-cycle wave. If the long-base saw-tooth wave STL is permitted to reach this extreme low-ermost point 274, it substantially instantly resets to its original voltage-value of 150 volts, as indicated by the point 275 in Fig. 3.

At an early point in the downward sweep of the long-base saw-tooth wave STL, and if desired, even before this wave completes its first five-volt drop to the point 271, the first electronic switch RPa triggers, as indicated by the point RPa in Fig. 3. Next, in time-sequence, come the triggering of the electronic switches PSa, PSb, PLa, BC, and PLb, at successive points along the short-base saw-tooth wave STS, as indicated, by way of example, in Fig. 3.

It will be recalled, from the description of Fig. 2, that when the first repetition period switch RPa closes, it short-circuits the synchronizing-signal bus SS, so that no more synchronizing signals can be received over this synchronizing-signal bus until the release of the switch RPa, which occurs at the moment when the long-period saw-tooth signal STL resets itself. Thus, when the short-period saw-tooth signal STS resets itself at 272—273, in Fig. 3, it is not triggered off, to commence another short-period saw-tooth wave, until after the long-period wave resets itself, so that both saw-tooth waves can then be retriggered at the same moment.

At some point during the downward sweep of the long-base saw-tooth wave STL, in Fig. 3, the second repetition-period switch RPb is triggered, at some such point as indicated at RPb in Fig. 3, just by way of giving an example. The effect of the closure of the electronic switch RPb, in Fig. 2 is to interrupt the discharging of the timing-capacitor 205 in Fig. 2, so that the long-base phanastron tube T4 immediately resets itself, so that the output-voltage, which appears on the long-base output-circuit STL of Fig. 2, rises substantially immediately to its initial voltage-value of +150 volts, as indicated by the point 276 in Fig. 3. During the resetting process of this long-base saw-tooth wave STL, the electronic switches RPa and RPb reopen, so that the switch RPa removes its short-circuit from the synchronizing-signal bus SS of Fig. 2.

Meanwhile, the time-switch group, which is shown near the bottom of Fig. 2, has reset itself, so that the time-switch TSA is no longer closed, but the time-switch TSB is closed. In Fig. 2, it will be seen that the top contact of the time-switch TSB, near the top of Fig. 2, now selects the supply-phase B of the 60-cycle supply-line, for furnishing the peaking-transformer peak which will be applied to the synchronizing-signal bus SS in Fig. 2.

Thus, in Fig. 3, when the first positive peaking-transformer peak occurs on the synchronizing bus of Fig. 2, after the point 276 in Fig. 3, a timer-triggering pulse will be received, at the point marked SS–B, at which time the two saw-tooth waves STS and STL will start down again, in a repetition of their timing operation.

It will be understood that each of the electronic switches has a millisecond adjustment, under the control of its grid-circuit potentiometer 222 of Fig. 2, so that it can be made to respond at any desired voltage-point, and hence at any desired time-point, along the saw-tooth wave which controls that particular switch.

While I have shown an exemplary electronic timer-control, as shown by Figs. 2 and 3, I wish it to be understood that any other type of relaxation-oscillator saw-tooth generator could have been used, or any other types of switches which are responsive to the voltages of the saw-tooth waves, or in fact other types of grid-bias controlling-equipment for the grid-circuits of the firing-tubes, such as the firing tube FT1, for the rectifier assembly, or for any other equipment for controlling the application of power to the direct-current power-line RA—RB in Fig. 1. It is believed, however, that the operation of my invention will better be understood by the inclusion of a showing of some precise, concrete circuit in which my invention is applied, and for which it was primarily designed and intended, as has been done in Figs. 1 to 3, although, of course, my invention is not limited to the precise circuit or application which has been chosen for illustration.

The effect of the electronic timer-control of Figs. 2 and 3 on the power-tubes or rectifier-tubes 1 to 12 of Fig. 1 is to cause the rectifier-tubes to deliver, to the power-line RA—RB, a succession of short power-pulses, with long intervals in between. The time between successive pulses is controlled by the long-base saw-tooth control-circuit STL of Fig. 2, and by the voltage-setting of the second repetition-period switch RP$b$ which controls the resetting-point of the long-base saw-tooth wave. Successive saw-tooth pulses are started at predetermined points in synchronism with peaking-transformer pulses in successive phases of the three-phase power-supply bus 13, under the control of the top contacts of the three time-switches TSA, TSB and TSC of Fig. 2. The starting and stopping of the power-pulses which are delivered by the rectifier-tubes are controlled by the short-base saw-tooth control-circuit STS of Fig. 2, and by the respective voltage-settings of the first pulse-start switch PS$a$ and the second pulse-length switch PL$b$ in Fig. 2.

The operation of the rectifier-tube assembly which is shown in Fig. 1 will be better understood with reference to the time-curve diagrams of Figs. 4 and 5, wherein Fig. 4 shows the continuing operation of the rectifier, once the rectifier-operation has been started, while Fig. 5 shows the starting and stopping of a single pulse, by means of rectifier-control, together with the output-voltage of the rectifier-tubes.

The wave-forms of Fig. 4 are in three parts. The upper part shows some of the sine-wave input-voltages 1 to 12 for the correspondingly numbered rectifiers 1 to 12 of Fig. 1, plotted on a time-base datum-line 289. The conducting periods of the various rectifier-tubes are indicated by heavy lines, showing that the load carried by the tube 9 begins to commute to the tube 1 at the point 281, and finishes its commutation at the time 282—282′, while the tube 1 thereafter commutes to the tube 5, and the tube 5 commutes to the tube 9, after which the process is continued. This shows the operation of the lowermost group of three-phase rectifiers 1, 5, and 9 in Fig. 1, these rectifiers being positively connected. The operation of the negatively connected three-phase group of rectifiers 7, 11, and 3 is also shown in Fig. 4, wherein the load carried by the tube 11 begins to commutate to the tube 3 at the point 283, and finishes that commutation at the time 284, 284′, after which the No. 3 tube commutates to the No. 7 tube, and the No. 7 tube commutates to the No. 11 tube. The corresponding operation of the other two three-phase groups of rectifiers in Fig. 1 is shown in Fig. 4, by dotted lines. The internal output-voltage of the entire assembly of rectifier-tubes 1 to 12, that is, the rectifier output-voltage neglecting commutating and filtering reactances, is always, at any instant, the sum of the four heavy-line output-voltage components which are shown in the top portion of Fig. 4.

The second portion of Fig. 4, using a time-base datum-line 290, shows the excitation-circuit voltages for the ignitor I1 of the first rectifier-tube 1, in Figure 1. In Fig. 4, the firing-capacitor 38 of Fig. 1 is indicated as at first being fully charged to the voltage E38. At the instant 291′ when the rectifier-ignitor 1 is fired, the firing-capacitor discharges, and continues its discharge until the time-point 291, when the capacitor swings to a negative discharge, due to the stored energy in the sloping inductor 39 and the reactance of the ignitor-transformer 35 in Fig. 1. Meanwhile, the anode-voltage of the firing-tube FT1 takes a stepped shaped somewhat as shown at E$_{FT1}$ in Fig. 4. The firing-capacitor 38 thereafter holds its negative charge until the point 292 is reached, in Fig. 2, corresponding to the time 292′ at which the charging-tube plate-voltage E41 and grid-voltage E43 become positive, referring to the charging-tube CT1 in Figure 1. The firing-capacitor 38 thereupon begins to charge, according to an exponential curve, during which time the anode-voltage of the firing-tube FT1 gradually rises until, at some such point as 293, the capacitor 38 becomes substantially fully charged again, ready for another firing-operation.

The bottom portion of Fig. 4, using a time-base 0—T, shows some of the voltage-components in the grid-circuit FG1 of the firing-tube FT1 of Fig. 1. The sine-wave grid-firing voltage, which is furnished by the transformer 44 of Fig. 1, is indicated at E44 in Fig. 4, while the negative half-wave of sinusoidal voltage, which is impressed across the resistor-terminals 53 in Fig. 1, is indicated in Fig. 4 at E53, and the resultant of these two voltages is indicated in Fig. 4 at E$_{FT1}$, indicating the resultant excitation-voltage on the firing-tube grid-circuit FG1 in Fig. 1.

The resultant direct-current grid-biasing voltage which is impressed upon the firing-tube grid-circuit of Fig. 1, between the points QP and F1, is indicated, by way of example in Fig. 4, as being a negative bias E$_{F1}$, which is plotted, reversed, in Fig. 4 (that is, the bias voltage —E$_{F1}$ is plotted), so that this negative bias-voltage may be regarded as simply raising the datum-line 0—T up to the value —E$_{F1}$. At the point, therefore, where the resultant excitation-voltage E$_{FG1}$ becomes positive with respect to the shifted datum-line —E$_{F1}$, as shown at the point 281″ in Fig. 4, the firing-tube FT1 is fired, causing this tube to apply the positive voltage E38 of the firing-capacitor 38 to the ignitor I1 of the first rectifier-tube 1 in Fig. 1, thereby firing said first rectifier tube and commencing the commutation-period which is indicated at 281—282 in the top portion of Fig. 4. In this firing-process, as shown in Fig. 4, the firing-circuit delays are (correctly) assumed to be small enough to be negligible, or too small to be shown on the time-scale which is used in Fig. 4.

Fig. 5 shows some of the wave-forms for a single pulse of power, as delivered by the rectifiers 1 to 12 of Fig. 1, showing the beginning and ending of the pulse. The actual filtered load-voltage, which is delivered to the power-line RA in Fig. 1, is indicated at E$_{RA}$ in the top portion of Fig. 5, plotted on a time-base datum-line 300. The equivalent direct-current rectifier-voltage, behind (or neglecting the filtering-effect of) the commutating reactance and the reactance of the filter 14 of Fig. 1, is indicated in Fig. 5 by the curve E+.

At the moment when the pulse is started, in Fig. 5, four rectifier-tubes are released at the same instant: the positively connected tube 1 and the negatively connected tube 4 are released at the point 301 in Fig. 5, while the positively connected tube 2 and the negatively connected tube 3 are released at the point 302. In the case which has been chosen for illustration in Figs. 1 and 5, this releasing-time is 45° after the zero 303 of the No. 1 line-to-neutral voltage 1, or 15° after the conventional 30-degree crossing-point 304 for simple three-phase rectifier-operation at which the declining phase-voltage 9 is crossed by the next-lagging, increasing, phase-voltage 1. At the instant of firing, therefore, the respective tubes 1, 2, 3, and 4 thus have ignition-angles of 15° delay, 15° advance, 45° advance, and 75° advance, respectively, with respect to the normal zero-delay rectifier-point. For the initial release-operation, and before the remaining rectifier-tubes 5 to 12 are fired as will be subsequently described, the initial conduction-periods for the tubes 2, 3, and 4 are abnormally long, because of the advances in their firing-angles.

The middle portion of Fig. 5 shows the currents which are supplied by the several rectifiers 1 to 12, plotted, for convenience, on two separate time-bases 305 and 306, and showing the commutation-periods as the time between the instant 307 (for example) when the rectifier-tube 5 first begins to carry current, and the instant 308 when the next leading rectifier 1, of this three-phase group 1, 5, 9, ceases to carry current after having transferred its load-current entirely to the tube 5. No commutating-current bias, having some such value as 311 in Fig. 5, time was required in the initial current-carrying periods of the first-fired tubes 1, 2, 3, and 4, because no current was being carried by their next-leading associated three-phase tubes at the moment of firing.

The lower portion of Fig. 5 shows some of the pulse-determining components of the grid-voltage of the firing-tube FT1 of Fig. 1, plotted on a time-base datum-line 310. Before the commencement of the pulse, the grid-circuit FG1 of the firing-tube FT1 had a negative direct. This negative blocking-bias, which is applied between the grid-circuit points QP and 59 in Fig. 1, is so large that none of the sinusoidal grid-firing voltages 1 to 12 of the transformers 51 and 52 in Fig. 1 can fire their associated firing-tubes, such as tube FT1. (It will be observed that only a portion of each of these sinusoidal grid-firing voltages 1 to 12 is shown in Fig. 5.)

At a certain time-instant 312—312', in Fig. 5, the pulse-start contact PS of Fig. 1 (or PSa of Fig. 2) closes, thereby impressing, on the first four firing-circuits F1 to F4, the positive bias-voltage 312' of the bias-source 45—46 in Fig. 1, assuming that the time-switch TSA stands closed, as described in the explanation of Fig. 2. This brings the negative grid-circuit bias 311 up to some fairly large positive bias-value 313, which is large enough to make sure that the firing-tubes (such as FT1) of the four rectifier-tubes 1, 2, 3 and 4 will fire instantly, thereby firing the ignitors and establishing an exciting-arc in all four of the rectifier-tubes 1, 2, 3 and 4.

In the illustrated example, in Fig. 5, the ignitor-firing moment 312' occurs very slightly before the pulse-start moment 313', which is the moment when the instantaneous sum of the impressed voltages on the four rectifier-tubes 1, 2, 3 and 4 passes through zero in changing from negative to positive. Thus, referring to the sinusoidal voltage-components at the top of Fig. 5, before the pulse-start moment 301 the positively connected tube 1 had a smaller positive voltage than 301, while the negatively connected tube 4 had a larger negative voltage than 301, so that the sum of these two voltages was negative. In like manner, before the pulse-start moment 302 the negatively connected tube 3 had a larger negative voltage than 302, while the positively connected tube 2 had a smaller positive voltage than 302, so that the sum of these two voltages was also negative. Thus, the firing-tubes (such as FT1) of the four rectifier-tubes 1, 2, 3 and 4 fired the respective ignitors, and caused exciting-arcs to be established on the auxiliary anodes, a short while before the instantaneous sum of the four impressed voltages became positive, so that these four rectifier-tubes stood in readiness to fire as soon as their voltage-sum became positive, or at the instant 312', 302, 301. In this manner, a power-pulse is started, with only the first four rectifier-tubes 1 to 4 carrying current.

A very short while after the ignitor-firing time 312—312', as shown at the bottom of Fig. 5, the starting-pulse is removed from the firing-tube grid-circuits, as shown at the moment 314—314', by the opening of the PS contact in Fig. 1, or the PSb contact in Fig. 2. This again applies the strong negative blocking-bias 311 to the firing-circuits F1 to F4, but this has no effect upon the firing-tubes, such as FT1, because these firing-tubes are thyratrons, or gas-filled tubes, in which the grid-circuit has no power to interrupt the firing of the tube, once said firing-operation has been started. Furthermore, the condition of the firing-tubes (such as FT1) could have no effect upon the corresponding rectifier-tubes 1 to 4 after their holding-arcs have been established, or, as in the illustrated example, after their main arcs have been established.

At a certain subsequent time 315, a positive direct-current bias-component 315—315' is applied to all twelve of the firing-circuits F1 to F12, by the closure of the pulse-length contact PL in Fig. 1, or PLa in Fig. 2. This makes all of the firing-circuits F1 to F12 of Fig. 1 have a total direct-current grid-circuit bias which may be zero, or close to zero, as shown at the bottom of Fig. 5, so that the successive firing-circuits of the twelve rectifier-tubes will thereafter proceed to operate in the manner which has already been described in connection with Fig. 4. The time-instant 315—315' when the PL-contact closes in Fig. 1 (or the PLa-contact in Fig. 2), should be after the pulse is started by the firing of the first four rectifier-tubes, and before the zero-delay point for the phase succeeding the phases of these four rectifier-tubes. More strictly speaking, it is desirable, in the particular twelve-phase rectifier-installation which is represented in Figs. 1 and 5, that the phase position of the closing of the contact PL shall be in the 60° interval between an instant which is 45° after the pulse-starting instant 312, and an instant which is 105° after said pulse-starting instant, as shown at 316 just under the upper portion of Fig. 5. Preferably, for the sake of safety, it is desirable to have this PL contact-closing time well within this interval, as indicated at 315 at the bottom of Fig. 5, or even at some somewhat earlier point.

The twelve rectifiers 1 to 12 continue to fire, in their normal manner, until a time-instant 317'—317, as indicated at the bottom of Fig. 5, at which time the PL contact opens in Fig. 1 (or the PLb contact in Fig. 2). From this time on, the four rectifier-tubes which were carrying current at said moment continue to carry current until their total combined input-voltages add up to zero, there being no more firing of rectifier-tubes after the time-instant 317'—317. The pulse is finally ended, at the instant 318 when these last four rectifier-tubes finally cease carrying current.

In the pulse-determining operations which are illustrated in Fig. 5, it will be observed that the equivalent internal direct current output-voltage of the rectifier-assembly 1 to 12 is equal, at any instant, to the sum of the line-to-neutral input-voltages of the four rectifiers which are carrying the load at any instant, using average voltages during the commutating-periods, such as the one which is shown, in the upper curves of Fig. 5, at 319. It will be observed that the effect of firing only four of the rectifier-tubes at the start of each pulse or each energization of the power-line RA—RB in Fig. 1, is that the voltage-curve of the pulse rises more or less gradually, along a curve which approximately corresponds to the first quarter of a sine-wave of the frequency of the rectifier supply-circuit 13. This is a valuable feature of my invention, in reducing the shock which would have been imposed on the high-voltage load-devices L1 and L2, if they had been suddenly impressed with the full high-voltage output of the rectifier.

From the operational explanations which have been given in connection with Figs. 4 and 5, it will be evident that my apparatus as shown in Fig. 1 involves a firing-angle control-means which, in its barest essentials, involves a sinusoidal grid-firing voltage-source 44, and means for applying various direct-current grid-biasing voltages, as at 66, 47, 63, 45, and the electronic timer-control contacts PS and PL of Fig. 1. These direct-current grid-biasing means may be changed, either manually or automatically, as slowly or as rapidly as may be desired or required, affording a means whereby the firing-angle of the rectifiers may be obtained at any point along the sinusoidal grid-firing voltage, over a wide range including both positive and negative values of said sinusoidal wave. The electronic switches PS and PL are examples of means for very rapidly changing the grid-circuit bias of the various firing-tubes such as the firing-tube FT1 for the rectifier-tube 1. The arc-suppressor tubes A, B, and C also constitute electronic means for rapidly controlling the direct-current grid-bias voltage which is effective in the grid-circuit of the firing-tubes, such as the tube FT1. The potentiometers 45, 47, and 69 constitute means whereby the firing-point may be manually selected or controlled, by controlling the amounts of the grid-circuit biases. The resistance 63 which is in series with the pulse-length contact PL, may be varied, either manually or automatically, either slowly or rapidly, as a means for controlling the firing-angle, and hence the output-voltage of the rectifier, so as to obtain any desired voltage-characteristic, under either manual or automatic control.

Various other features of my invention will be illustrated and described in connection with three alternative forms of embodiment, which are shown in Figs. 6, 8, and 10 respectively.

Fig. 6 is directed to a modification of the apparatus shown in Fig. 1 in which, instead of initially firing only four of the rectifier-tubes, in order to obtain a gradual buildup of the output-voltage of the rectifier-assembly, all of the rectifier-tubes are fired, and the value of the direct-current output-voltage during the buildup-period is controlled by rapidly changing the ignition-delay, by grid-bias control, during this buildup-period. Thus, the apparatus of Fig. 6 omits the electronic pulse-starting switch PS and the time-switches TSA, TSB, TSC of Fig. 1, and substitutes, serially connected in the grid-circuit FG1 of the firing-tube FT1, a grid-circuit resistor 323, which is shunted by a positive-bias circuit containing a potentiometer 325, the electronic pulse-length control-contact PL, which has already been described in connection with Figs. 1 and 2, and an inductor 325', which serves as a means for obtaining an exponential bias-change by introducing any required amount of delay in the buildup of the positive grid-biasing voltage-component in the grid-circuit FG1 of the firing-tube FT1. The positive-bias potentiometer 325 may be energized from any suitable direct-current voltage-source which is represented by a battery 326.

The firing-grid circuit FG1 of Fig. 6 also contains a variable-voltage grid-biasing potentiometer 327, which is shown, by way of example, as supplying a positive voltage-component to the direct-current biasing-voltage of the grid-circuit FG1, although it is to be understood that the grid-bias could have been varied either up and down by this means, that is, that the variable-voltage grid-biasing potentiometer 327 could be used to introduce either a positive or a negative variable voltage-component. This potentiometer 327 is energized by means of a battery 328.

This potentiometer 327 in Fig. 6 has a slider 330 which is shunted by a voltage-regulator 331, which is indicated by block-diagram in Fig. 6, and which may be used, either under electromagnetic, electronic, or other control, to introduce a variable amount of short-circuiting resistance across the potentiometer 327 in response to the difference between the rectifier output-voltage, such as the voltage across the power-line RA—RB, and a constant direct-current reference-voltage 332. This voltage-regulator 331, in Fig. 6, thus serves as a means for rapidly controlling the grid-bias of the firing-transformer FT1, and hence as a means for rapidly varying the firing-angle, and hence the output-voltage of the rectifier-assembly 1 to 12, by changing the firing-point at which the sinusoidal firing-voltage of the source 44 makes the firing-tube grid FG1 positive with respect to the firing-tube cathode QP.

In addition to the sinusoidal grid-firing voltage-source 44, the Fig. 6 circuit also includes the source of negative sinusoidal half-waves, as shown at 53, 54, and 55, as described in connection with Fig. 1. Fig. 6 differs from Fig. 1, however, in having the firing circuit F1, for the No. 1 rectifier, connected to the corresponding firing-circuits F2 to F12 for all of the other rectifier-tubes, so that all of the rectifier-tubes will be fired simultaneously, or, more accurately, all of the other rectifier-tubes will have their firing-controlling means simultaneously biased so that each firing-controlling means will be ready to fire when its sinusoidal firing-voltage becomes able to apply a positive resultant grid-voltage to the corresponding firing-tube, such as the firing-tube FT1.

In addition to all of the above-described grid-controlling equipment, the firing-grid circuit FG1 of the firing tube FT1 in Fig. 6 also contains a peaking-transformer 335, which is suitably energized through a manually adjustable phase-shifter φ-SH. This peaking-transformer is designed to apply a positive grid-biasing impulse at substantially the positive crest value of the sinusoidal grid-firing voltage of the source 44, for the purpose of increasing the range of firing-control by making it possible for the firing-angle to be adjusted (by direct-current grid-bias) so it occurs at substantially the crest of the firing-controlling sinusoidal voltage-wave, as will be subsequently described.

The apparatus shown in Fig. 6 also has different phase-angles for the excitations of the grid-circuit transformer 43 in the grid-circuit of the charging-tube CT1, and the negative half-wave sinusoidal voltage-source 54 and the sinusoidal grid-firing positive-voltage source 44 in the grid-circuit of the firing-tube FT1. These alternating-current sources or transformers, in Fig. 6, are energized from an auxiliary excitation-bus UX, UY, UZ, which is energized from a star-delta transformer 338, which derives its energy from the excitation-bus X, Y, Z of Fig. 1, or from an X, Y, Z bus having similar phasing, which is supplied by means of a star-delta excitation-transformer 339, which is indicated, in Fig. 6, as being energized from the anode-terminals of the rectifier-tubes 1, 5, and 9. Otherwise, the apparatus which is partially shown in Fig. 6 is, or may be, identical with that which is shown in Fig. 1.

The operation of the pulse-controlling aspects of my invention, as shown in Fig. 6, will best be understood by reference to Fig. 7. This figure contains three sets of voltage-curves, which are plotted, with different voltage-scales, on three different time-base datum-lines 341, 342, and 343, respectively, the same time-scale being used in each case.

In the top portion of Fig. 7, the jagged line 1, 2, 2, 3', etc., represents the equivalent theoretical internal direct-current rectifier-voltage, not counting the voltage-smoothing effects of the commutating or filtering reactances, with the plain-numbered points 1, 2, 3, etc., indicating the points at which the correspondingly numbered rectifier-tubes are fired, and with the primed points 3', 4', 5', etc., indicating the ends of the commutating-periods at which the correspondingly numbered rectifier-tubes took over all of the load-current from the next leading rectifier-tube in that three-phase group. I am here referring to the four three-phase groups which are shown in Fig. 1, namely, 1, 5, 9; 7, 11, 3; 2, 6, 10; and 8, 12, 4. In this top portion of Fig. 7, the twenty-kilovolt line represents the desired steady-state output-voltage of the rectifier, while the dotted lines, representing a plus or minus four-per-cent voltage-variation, represent the tolerable voltage-variation which is permitted by the voltage-regulator 331 of Fig. 6, in this particular installation.

The second portion of Fig. 7, built around the datum-line 342, represents the sinusoidal line-to-neutral input-voltages 1 to 12 of the correspondingly numbered rectifiers in Fig. 1 (or Fig. 6). The portions of the rectifier input-voltage waves during which the respective rectifier-tubes are conducting current, as well as the voltage-values during the commutating-periods, are indicated by heavy lines in Fig. 6, in a manner similar to that which has already been shown and described in connection with Fig. 4.

The bottom portion of Fig. 7, which is based upon the datum-line 343, shows portions of the sinusoidal grid-firing voltage-waves FG1 to FG12, which are impressed, by the transformer 44, on the firing-grids of the firing-tubes for the correspondingly numbered rectifiers 1 to 12. At the crest of each of these sinusoidal firing-voltages, is shown a somewhat idealized peaking-transformer voltage-impulse E335, such as is supplied by the peaking-transformer 335 in Fig. 6.

Initially, before the pulse-starting switch PL closes, in Fig. 6 (or PLa in Fig. 2,) there is a certain negative direct-current bias on the grid-circuits of all of the firing-tubes, such as the tube FT1 in Fig. 6. This is shown, reversed, in the bottom portion of Fig. 7, as the bias-voltage $-E_{F1}$. It will be noted that this reversed bias-voltage line $-E_{F1}$ intersects the peak portions E335 which are applied at the crests of all of the sinusoidal grid-firing voltages FG1 to FG12. This means that, during this time, the ignitor of each of the twelve ignitron-tubes fires, establishing a temporary exciting-arc on the excitation-anode of that tube, once every cycle, but no currents are carried by the main anodes of any of these rectifier-tubes, because the firing-angle is so late that the total of the four input-voltages of any four serially connected tubes is a minus voltage, so that the tubes can have no output-current. Thus, as shown in the central portion of Fig. 7, at the 0° point, the first heavy vertical line indicates the firing of the ignitor of the rectifier-tube 11, when the current would be commuted from the No. 7 tube to the No. 11 tube if there were any current to commute. Likewise, at the 30° point, the second heavy vertical line indicates the time when the ignitor of the tube 12 fires, and when the current would be commuting from the No. 8 tube to the No. 12 tube if there were any current to commute.

In the lower portion of Fig. 7, on the datum-line 0—343, I have assumed a point 353 at which the rectifying-starting switch-contact PL closes, in Fig. 6. Under the influence of the inductor 325' in Fig. 6, this switch-contact PL applies an exponentially increasing positive bias-voltage, which has been reversed, and plotted at —E325 in Fig. 7, this voltage being algebraically added to the negative bias $E_{F1}$, so as to apply a declining negative biasing-voltage $E_F$ to the common firing-conductor points F1 to F12 for all twelve of the firing-tubes. It will be understood that, when this $E_F$ curve in Fig. 7 crosses the datum-line 0—343, as indicated at 354, said curve thereafter represents positive biasing-voltages, showing below the datum-line 0—343 because the biasing voltages have been reversed, in accordance with the convention which was explained in connection with the lower portion of Fig. 4.

It will thus be seen, from the bottom portion of Fig. 7, that when the reversed direct-current bias-curve $E_F$ crosses, or is crossed by, the sinusoidal grid-firing voltage-wave FG1, at the point 355, the firing-angle of the No. 1 rectifier tube is advanced from the point 356, which it would have had if the PL contact had not closed in Fig. 6, to said point 355 in Fig. 7. Thus, in the central portion of Fig. 7, it will be seen that the No. 9 rectifier-tube, if it had any load-current to commute (but it has not), would commute that current at the point 357, causing the No. 1 rectifier-tube to fire at the point 358 on the input voltage-wave 1 of that tube. The No. 1 rectifier-tube thereupon begins to carry load-current, because the total of the voltages of the four consecutively numbered tubes 10, 11, 12, and 1, as indicated by the points 360, 361, 362, and 358, will now be positive, indicating that these tubes can now carry load-current.

In the particular example illustrated, the instantaneous total voltage of these four first-fired tubes, and their load currents, become zero just about the time when the No. 2 rectifier-tube fires, which is at the crossing-point between the reversed $E_F$ curve and the FG2 curve, as indicated at 363 in the lower portion of Fig. 7. The current thereupon transfers from the No. 10 tube to the No. 2 tube, this current being substantially zero at the moment of transfer, so that there is no commutating period. Thereafter, as the following rectifier-tubes 3, 4, 5, 6, 7, and 8 are fired, at the crossing-points between their respective sinusoidal grid-voltages FG3 to FG8 and the reversed bias-voltage curve $E_F$, the load-currents begin to transfer to the correspondingly numbered rectifier-tubes 3 to 8, completing their transfers, at the primed points 3' to 8', only after passing through commutating-periods, as indicated.

It will be noted that the firing-angles of successive rectifier-tubes 1 to 8 are becoming smaller and smaller, because of the rapid progressive change in the direct-current biasing-voltage $E_F$, as a result of the exponential current-changing function of the inductor 325' in Fig. 6. As a result of this progressive decrease in the firing-angles of the rectifier-tubes, the total rectifier-voltages, which are the sums of the input-voltages of the four rectifiers which are carrying load-current at any particular instant, become progressively higher and higher, as shown in the top portion of Fig. 7. The jagged peaks of the theoretical internal rectifier output-voltage do not show up in the actual output-circuit, when due allowance is made for the commutating and filtering reactances, so that the actual load-voltage, which is applied to the load-circuit RA—RB, in Fig. 6, is a much smoother curve, as indicated by the filtered-output curve 368 in Fig. 7. At the point where this filtered-output voltage-curve 368 crosses the minimum regulator-voltage line, 20KV—4%, the voltage-regulator 331 of Fig. 6 begins to come into play. This regulator may have any one of a number of different characteristics.

It will be assumed, by way of giving a concrete example, that the voltage-regulator 331 of Fig. 6 is an electronic regulator, and that it develops a component of biasing-voltage, having a magnitude which varies approximately as the height of the output-voltage curve 368 above the minimum regulator-voltage line which is marked 20KV—4% in Fig. 7. It will be assumed, for example, that the voltage-regulator 331 makes the grid-circuit bias more negative, by a variable amount which is indicated, reversed, at the bottom of Fig. 7, by the voltage —E327, so that the reversed grid-bias voltage-curve $E_F$ is changed, by the regulator, to a curve such as $E_F'$. Thus, by adding more negative bias to the firing-circuits F1 to F12 in Fig. 6, the voltage regulator 331 increases the firing-angles of the rectifier-tubes, and thus reduces the output-voltage of the rectifier-tubes. It also performs this function very quickly, because it is possible to electronically control a resistance, such as the internal resistance of the regulator, more quickly than any mechanical adjustment can be made.

Thus, it will be seen, from the lower portion of Fig. 7, that the modified bias-curve $E_F'$ crosses the No. 9 sinusoidal firing-wave FG9 at the point 370, which causes the load-current to begin to commute from the rectifier-tube No. 5 to the rectifier-tube No. 9. In like manner, at the crossing-points 371 and 372 at the bottom of Fig. 7, the load-current begins to transfer from 6 to 10, and from 7 to 11, respectively, as indicated by the jagged points 10 and 11 in the jagged curve at the top of Fig. 7.

In the operation of my device, in the form shown in Figs. 6 and 7, it will thus be seen that I have achieved a gradual voltage buildup, at the beginning of each pulse, or when direct-current power is first applied to the power-line RA—RB, using the expedient of rapidly changing the direct-current bias, first by means of the inductance 325', and later on by means of the voltage-regulator 331, so as to obtain, not only a gradual buildup of the filtered output-voltage 368 of the rectifier-assembly, but also a very rapidly and sensitively regulated constant-voltage rectifier-output, after full-voltage conditions have been obtained, so as to thereafter hold the voltage quite constant, within much closer limits than has heretofore been possible, with an equal amount of filtering-reactance 14.

Heretofore, I have not explained the function of the negative or blocking sinusoidal half-wave biasing-voltages which are produced by the transformer 54, which is connected across the terminals of the grid-circuit resistor 53. Also, in Fig. 6, I have shown, without discussion, a grid-circuit transformer 43, for the charging-tube CT1, having a phase-angle which differs from the phase of the anode-circuit transformer 41 for this same charging-tube CT1. I prefer to explain these matters, and the general principles of the various phase-angle relationships, in connection with two simpler forms of embodiment of my invention, which I have shown in Figs. 8 and 10.

In Fig. 8, I show a six-phase rectifier-system, including six consecutively numbered rectifier-ignitrons 1 to 6, which are disposed in two serially connected three-phase groups 1, 5, 3, and 2, 6, 4, which are respectively energized from two secondary-windings 381 and 382. The excitation-bus X, Y, Z may be energized from a star-delta excitation-transformer 339 which is energized from the anode-terminals of the first three-phase rectifier-group, as described in connection with Fig. 6.

In Fig. 8, I have shown the excitation-means for the ignitor I1 for only the first rectifier-tube 1. All of the other controls may be more or less conventional, or they may be obvious adaptations of the controls which have been described in connection with Fig. 1. This ignitron-firing circuit in Fig. 8 uses a firing-tube FT1, energized from a firing-capacitor 38, and a charging-tube CT1, for charging the capacitor 38, as described in Fig. 1, with the following exceptions.

In Fig. 8, the grid-circuit of the charging-tube CT1 is energized from a grid-circuit transformer 43 which delivers a sinusoidal voltage having a 60° delay behind the charging-voltage which is delivered to the positive terminal QP of the charging-capacitor 38 by the charging-transformer 41.

As in Fig. 1, the firing-transformer grid-circuit FG1 is similar to the extent of containing the previously described resistor 66 having the arc-quench terminals QP and QN, the reversible negative-bias potentiometer 47, and the resistor 61 which is shunted by the pulse-length contact PL and the variable resistor 63. In Fig. 8, for the sake of simplicity, I have omitted the supervisory relays PA1 and PA2 of Fig. 1, and have solidly connected the conductors 58 and 59 which have previously been described in connection with Fig. 1. The resistors 62A, 62B, and 62C of Fig. 1, as well as the time-switches TSA, TSB, and TSC, and the negative sinusoidal half-wave source 53—54, have all been replaced, in Fig. 8, by a resistance 62S, which is shunted by a circuit containing the positive-bias potentiometer 45 and the pulse-start contact PS as described in Fig. 1, the potentiometer 45 being charged from a battery 46, as before.

In Fig. 8, the firing-transformer grid-circuit FG1 is also controlled, as in Fig. 1, by means of a sinusoidal grid-firing voltage-source which is represented by the transformer 44. Like Fig. 6, the firing-tube grid-circuit FG1 of Fig. 8 is also provided with a peaking-transformer 335, which is energized from a mechanically adjustable phase-shifter $\phi$-SH.

Fig. 9 illustrates the operation of the apparatus shown in Fig. 8, by showing wave-forms which are plotted on three time-base datum-lines 391, 392, and 393. The first curves, at the top of Fig. 9 on the time-base 391, show the three anode line-to-neutral voltages 1, 3 and 5 of the rectifier-tubes 1, 3 and 5 of Fig. 8, with an indication of various ignition-angles $\alpha$, for a three-phase electronic power-converter. The middle curves, in Fig. 9, plotted on the time-base 392, show the impressed anode-voltage E41 on the charging-tube CT1 of Fig. 8, the charging tube grid-voltage E43, the charging-capacitor voltage E38, and the firing-tube anode-cathode voltage $E_{FT1}$, set for an ignition-angle $\alpha = 80°$, in a manner similar to that which has been described for the central portion of Fig. 4, except that here, in Fig. 9, the ignition or firing-angle is different, and the grid-voltage E43 of the charging-tube CT1 lags the charging-voltage E41 by a 60° delay. The lower portion of Fig. 9, shows the sine-wave grid-firing voltage E44 for the firing-tube FT1 of Fig. 8, plotted on the time-base 393, with the addition of the positive and negative voltage-impulses E335 which are supplied by the peaking-transformer 335. The bottom portion of Fig. 9 also shows a line 394, representing the negative bias for producing an ignition-angle of $\alpha = 80°$, and also a line 395 indicating the positive bias for an ignition-angle of $\alpha = 0$.

The operation of the apparatus shown in Figs. 8 and 9 is as follows. With the firing-tube FT1 having its direct-current bias set for a positive value 395, for zero-delay firing, as shown at the bottom of Fig. 9, the grid-voltage of this firing-tube FT1 is positive for 240°, over the range from 396 to 397. The rectifier-tube 1 of Fig. 8 is fired at the point of intersection of the firing-tube bias-voltage, such as 396, with the ascending portion of the sinusoidal alternating component E44 of the grid-voltage of the firing-tube FT1. Thus, at this junction-point 396, the firing-tube FT1 would fire, at a time corresponding to a zero firing-delay, that is, the voltage $E_{FT1}$ in the central portion of Fig. 9, would start downwardly, at the point 396', from the maximum positive charging-capacitor voltage E38 in the central portion of Fig. 9.

At a more negative bias, such as that which is shown at 394 at the bottom of Fig. 9, the firing-tube FT1 would fire at the point 398, corresponding to a delay-angle $\alpha = 80°$, as shown by the lines $E_{FT1}$ in the central portion of Fig. 9.

At a still more negative bias (not shown at the bottom of Fig. 9), the firing-tube would fire at a point closer to the crest of the sinusoidal grid-firing component E44. In cases where it is required to have reliable firing at or near the crest of the sine-wave firing-voltage E44, or at a 120° delay in this case, the peaking-transformer 335 is used in Fig. 8, and adjusted in its phase-position, as by means of the phase-shifter $\phi$-SH, so as to produce its peak E335 at or near the crest of the sinusoidal firing-voltage E44. If it is not necessary to operate close to the crest of the sine wave, this peaking-transformer can be omitted.

When the firing-capacitor 38 discharges, in its operation of firing the rectifier-tube 1, in Fig. 8, it discharges until its charge is reversed, carrying the plate-voltage of the firing-tube FT1 down to a negative value 400, as shown in the middle portion of Fig. 9. If the charging-tube CT1 had no grid-control, it would commence recharging the firing-capacitor 38 at the point where the sinusoidal charging-voltage curve E41 crossed the negative-charge line 400, as indicated at 401 in Fig. 9. With grid-control on the charging-tube CT1, however, as indicated by the grid-voltage E43 in Fig. 9, the charging-operation is delayed until the charging-tube grid becomes positive at the point 402, which is shown as being 60° lagging with respect to the phase of the charging-voltage E41, as shown in Figs. 8 and 9. Therefore, at the time-instant 402, the firing-capacitor 38 begins to recharge, its recharging-curve being indicated at 403—404 in Fig. 9, until finally the charging-capacitor 38 has its maximum positive voltage-value E38, in readiness for a repetition of the firing-operation.

The apparatus in Fig. 10 is the same as that which has been described for Fig. 8, except that some of the excitation phase-angles are different, and a sinusoidal negative or blocking half-wave grid-control voltage has been added, in the grid-circuit of the firing-tube FT1, through the medium of a transformer 54 and a secondary-circuit rectifier 55, which are connected across a grid-resistor 53, as described in connection with Fig. 1. In Fig. 10, an auxiliary excitation-bus UX, UY, UZ, is used, as described in Fig. 6, and the excitation-transformers 43, 54 and 44, as well as the phase-shifter $\phi$-SH, derive their energizations from this auxiliary excitation bus. Otherwise, the connections in Fig. 10 are the same as those in Fig. 8.

The operation of the apparatus shown in Fig. 10 will best be explained by the curves which are shown in Fig. 11, which are plotted in three groups, on the base-lines 411, 412, and 413. On the first base-line 411 in Fig. 11, I have plotted the sinusoidal input-voltage 1, for the rectifier-tube 1 in Fig. 10. The second group of curves, in Fig. 11, using the time-base 412, includes the sinusoidal charging-voltage E41, which is applied to the anode-circuit of the charging-tube CT1 for charging the firing-capacitor 38; the sinusoidal charging-controlling grid-voltage E43, which is applied to the grid-circuit of the charging-tube CT1 through the grid-circuit transformer 43, and two heavy-line charging-capacitor voltage-curves, including a full-line curve E38 which is plotted for a discharge of the firing-tube FT1 at an ignition angle of $\alpha=0$, as indicated by the full-line firing-tube voltage EFT1, and a dotted-line firing-tube voltage E38', which is plotted for the firing of the firing-tube FT1 at an ignition-angle of $\alpha=150°$, as indicated by the dotted-line firing-tube voltage EFT1. The bottom portion of Fig. 11, using the time-base 413, plots the sinusoidal firing-tube grid-voltage component E44 and the peaking-transformer pulses E335, as in Fig. 9, to which has been added the negative sinusoidal half-wave voltages E54, which are impressed by the transformer 54, so as to modify the firing sine-wave voltage E44 to produce a resultant voltage 415.

Figs. 10 and 11 relate to a control-circuit apparatus in which the grid-control of the charging-tube CT1 introduces a grid-voltage E43, through the transformer 43, which has a 30° delay with respect to the phase-angle of the charging-voltage E41 which is applied by the charging-transformer 41 to the anode-circuit of the charging-tube CT1. Figs. 10 and 11 differ from Figs. 8 and 9 also in having the firing sine-wave E44, in the grid-circuit of the firing-tube FT1, lag the impressed anode-circuit rectifier-voltage 1, by 90°, instead of the 60-degree angle which was shown in Figs. 8 and 9.

To produce a zero ignition-angle $\alpha$, in Fig. 11, therefore requires a stronger positive grid-bias 416 in Fig. 11, than the corresponding bias 395 in Fig. 9. The intersection-point of this grid-bias voltage 416 with the sinusoidal firing-wave E44 in Fig. 11 produces the firing-point 417, corresponding to the heavy-line firing-curve EFT1 in Fig. 11, for a zero-angle firing-delay. If it were not for the negative sinusoidal half-wave blocking-voltage E54, the firing-tube grid, in Figs. 10 and 11, would remain positive over a 300° range, or from the point 417 to the point 418, on the firing sine-wave E44 in Fig. 11. With the introduction of the negative half-wave E54 in the grid-circuit of the firing-tube FT1, the alternating components of the firing-tube grid-voltages are altered to the resultant voltage-wave 415, so that, with the grid-bias adjusted to the value 416 corresponding to zero-delay firing, the firing-tube grid remains positive for only about 220°, or from the point 417 to the point 419, as shown at the bottom of Fig. 11.

The significance of this advance of the last instant of release of the FT1 grid, from the point 418 to the point 419, as shown at the bottom of Fig. 11, as a result of the introduction of the negative half-wave E54 which is supplied by the transformer 54 and the rectifier 55 in Fig. 10, will best be understood by reference to the heavy full-line firing-capacitor voltage-curve E38 in the central portion of Fig. 11. When the firing-tube bias is set to fire the firing-tube FT1 at a zero-delay ignition-angle $\alpha$, the firing-capacitor 38 is quickly discharged to a negative value as indicated by the point 421 in the central portion of Fig. 11. Since this value is lower than the charging-voltage E41 which is being impressed on the anode-cathode circuit of the charging-tube CT1 at the moment, the firing-capacitor 38 will immediately begin to partially recharge, following an exponential curve 422, until it reaches the voltage-value of the sinusoidal charging-voltage E41, at the point 423, after which the firing-capacitor will hold a constant value, as indicated by the line 423—424, until the capacitor begins to recharge again, at the point 124.

It will be observed that, at this time, the firing-capacitor 38 is not only fully discharged, but is somewhat over-discharged, to a reversed or negative value which is indicated by the line 423—424. The final recharging of the firing-capacitor 38 commences at the point when the charging-tube grid-voltage E43 becomes positive, as indicated at 425, this point being vertically above the point 424, or at the same instant of time. If the negative half-wave blocking-voltage E54 had not been added, the grid of the firing-tube FT1 would still have had a positive value at this point, as indicated by the height of the point 426 over the bias-line 416 at the bottom of Fig. 11. Hence, as the firing-tube recharged, over the heavy exponential line 427, as soon as it began to become positive, at the point 428, it would begin to discharge again, by refiring the firing-tube FT1, thereby discharging the capacitor prematurely, before it is desired to refire the rectifier-tube 1, and also before the firing-capacitor 38 has had a chance to become fully recharged in readiness for such a rectifier-firing operation.

Furthermore, if the charging-tube CT1 of Fig. 10 had not been provided with a grid-circuit control, involving the use of a sinusoidal grid-voltage E43, as shown in Fig. 11, then the final recharging-operation of the of the firing-capacitor 38 would have commenced at the intersection between the negative-charge line 423—424 and the sinusoidal charging-voltage wave E41, as indicated by the point 429, which is illustrated as being some 24° prior to the point 419 at which the grid of the firing-tube FT1 ceases to be positive, even when the negative sinusoidal half-wave of biasing-voltage E54 is being used, so that the recharging of the firing-capacitor 38 would again have been commenced prematurely.

If, now, a strong negative bias had been used in the grid-circuit of the firing-tube FT1, as shown for example by the bias-line 431 at the bottom of Fig. 11, so as to intersect the packing-transformer pulse E335 and fire the rectifier 1 at an ignition-angle $\alpha$, which is close to 150°, the firing tube FT1 occur at this point, as indicated by the heavy dotted lines EFT1 in the central portion of Fig. 11, so that the firing-capacitor 38 would be discharged to some over-discharged negative value such as is indicated by the horizontal line 433. With delayed firing of the charging-tube CT1, by the use of the delayed grid-control voltage E43, the firing-tube 38 would begin its recharging-operation at the point 434, at the same time-instant as the previously described point 425 when the grid-voltage E43 begins to become positive. Without the use of the delayed grid-firing voltage E43 to delay the firing of the charging-tube CT1, the recharging of the capacitor 38 would have commenced at the premature point 435 where the charging-voltage E41 intersects the line 433 representing the over-discharged negative voltage of the capacitor 38.

It is believed that these explanations, in connection with the wave-form curves of Fig. 11, will clarify the utility and functions of the peaking-transformer 335, the negative half-wave sinusoidal biasing-voltage of the transformer 54 with its rectifier 55, the charging-tube grid-control voltage 43, and the various phase-relationships of the several excitation or control-voltages.

While I have described by invention, and explained its theory of operation, in only a few representative forms of embodiment, which have been greatly simplified to facilitate the diagrams and the explanations, I wish it to be understood, of course, that my invention is not limited to the chosen illustrations, as various changes may be made, without departing from the essential spirit of my invention, as by the way of the substitution of equivalents, the addition of refinements and other features, and the omission or modification of parts which are not necessary or which may be used with different modifications or adjustments.

I claim as my invention:

1. A combination including a plurality of alternating-current supply-leads, a power-line, a plurality of power-tubes connected between said supply-leads and said power-line, each power-tube having a control-circuit means, of a type requiring suitable energization before each conducting-period of that power-tube, and a firing-control means for energizing the control-circuit means of the several power-tubes in a manner suitable for producing an operative condition of said power-tubes, the firing-control means for each power-tube including a grid-controlled firing-tube having a grid-circuit including a source of essentially sine-wave firing-control voltage having a fixed predetermined phase-relation with respect to the supply-leads, said phase-relation being so phased, with respect to the supply-voltage of the associated power-tube, as to provide a wide range of firing-control for the power-tube, a source of bias-voltage for the grid-circuit of each firing-tube, and a means for rapidly changing the bias-voltage in such manner as to rapidly select the points, on the sine wave, at which the several firing-tubes fire, the grid-circuit of each firing-tube further including a source including the negative half-waves of a pulsating bucking-voltage having such phase-relation with respect to the firing-control voltage as to become effective at a substantial value of the firing-control voltage.

2. The invention as defined in claim 1 further characterized by the bucking-voltage having an essentially sinusoidal form.

3. The invention as defined in claim 1 further characterized by the grid-circuit of each firing-tube further including a source of peaker-voltage for providing a short positive voltage-impulse near the positive crest in the firing-control voltage.

4. A combination including a plurality of alternating-current supply-leads, a power-line, a plurality of power-tubes connected between said supply-leads and said power-line, each power-tube having a control-circuit means, of a type requiring suitable energization before each conducting-period of that power-tube, and a firing-control means for energizing the control-circuit means of the several power-tubes in a manner suitable for producing an operative condition of said power-tubes, the firing-control means for each power-tube including a grid-controlled firing-tube having a grid-circuit including a source of essentially sine-wave firing-control voltage having a fixed predetermined phase-relation with respect to the supply-leads, said phase-relation being so phased, with respect to the supply-voltage of the associated power-tube, as to provide a wide range of firing-control for the power-tube, a source of bias-voltage for the grid-circuit of each firing-tube, and a means for rapidly changing the bias-voltage in such manner as to rapidly select the points, on the sine wave, at which the several firing-tubes fire, the grid-circuit of each firing-tube further including a source of peaker-voltage for providing a short positive voltage-impulse near the positive crest in the firing-control voltage.

5. A combination including a plurality of alternating-current supply-leads, a power-line, a plurality of power-tubes connected between said supply-leads and said power-line, each power-tube having a control-circuit means, of a type requiring suitable energization before each conducting-period of that power-tube, and a firing-control means for energizing the control-circuit means of the several power-tubes in a manner suitable for producing an operative condition of said power-tubes, the firing-control means for each power-tube including a grid-controlled firing-tube having a grid-circuit and a plate-cathode circuit, the grid-circuit of each firing-tube including a source of essentially sine-wave firing-control voltage having a fixed predetermined phase-relation with respect to the supply-leads, said phase-relation being so phased, with respect to the supply-voltage of the associated power-tube, as to provide a wide range of firing-control for the power-tube, sources of positive and negative bias-voltages for the grid-circuit of each firing-tube, and a means for rapidly changing the bias-voltage in such manner as to rapidly select the points, on the sine wave, at which the several firing-tubes fire, and the plate-cathode circuit of each firing-tube comprising a firing-capacitor, a grid-controlled charging-tube for each firing-capacitor, a source of essentially sine-wave charging-voltage for the plate-cathode circuit of each charging-tube, and a delayed-firing grid-circuit control-means for delaying the firing of each charging-tube.

6. The invention as defined in claim 5, characterized by the delayed-firing grid-circuit control-means for each charging-tube causing a firing-delay until after the last moment when the grid-voltage of the associated firing-tube can become sufficiently positive to fire the firing-tube.

7. The invention as defined in claim 6, characterized by the grid circuit of each firing-tube further including a source including the negative half-waves of an essentially sine-wave bucking-voltage having such phase-relation with respect to the firing-control voltage as to become effective after the positive crest in the firing-control voltage.

8. The invention as defined in claim 7, further characterized by the grid-circuit of each firing-tube further including a source of peaker-voltage for providing a short positive voltage-impulse near the positive crest in the firing-control voltage.

9. The invention as defined in claim 8, characterized by the delayed-firing grid-circuit control-means for each charging-tube causing a firing-delay until after the last moment when the grid-voltage of the associated firing-tube can become sufficiently positive to fire the firing-tube.

10. The invention as defined in claim 7, characterized by the delayed-firing grid-circuit control-means for each charging-tube causing a firing-delay until after the last moment when the grid-voltage of the associated firing-tube can become sufficiently positive to fire the firing-tube.

11. The invention as defined in claim 7, characterized by the grid-circuit of each firing-tube further including a source of peaker-voltage for providing a short positive voltage-impulse near the positive crest in the firing-control voltage.

12. The invention as defined in claim 11, characterized by the delayed-firing grid-circuit control-means for each charging-tube causing a firing-delay until after the last moment when the grid-voltage of the associated firing-tube can become sufficiently positive to fire the firing-tube.

13. A combination including a plurality of polyphase supply-leads, an initially deenergized direct-current power-line, a plurality of rectifier-tubes connected between said supply-leads and said power-line, each rectifier-tube having a control-circuit means, of a type requiring suitable energization before each conducting-period of that rectifier-tube, and a firing-control means for energizing the control-circuit means of the several rectifier-tubes in a manner suitable for producing an operative condition of said rectifier-tubes, the firing-control means for each rectifier-tube including a grid-controlled firing-tube having a grid-circuit including a source of essentially sine-wave firing-control voltage having a fixed predetermined phase-relation with respect to the supply-leads, said phase-relation being so phased, with respect to the supply-voltage of the associated rectifier-tube, as to provide a wide range of firing-control for the rectifier-tube, a source of an initial tube-blocking bias-voltage for the grid-circuit of each firing-tube, and a rectifier-starting means for applying a rapidly changed tube-firing bias-voltage to the grid-circuits of the respective firing-tubes in such manner as to cause some successive firing-tubes to fire at different points on their respective sine-wave firing-control voltages during the initial voltage-buildup on said direct-current power-line, whereby to provide a gradual voltage-buildup.

14. The invention as defined in claim 13, characterized by the rectifier-connections being such that the output-voltage which is applied to the power-line at any instant is the sum of a plurality of adjacent-phase supply-lead voltages in series.

15. A combination including a plurality of supply-leads of a polyphase system having more than three phases, an initially deenergized direct-current power-line, a plurality of rectifier-tubes connected between said supply-leads and said power-line, the rectifier-connections being such that the output-voltage which is applied to the power-line at any instant is sum of a plurality of adjacent-phase supply-lead voltages in series, each rectifier-tube having a control-circuit means, of a type requiring suitable energization before each conducting-period of that rectifier-tube, and a firing-control means for energizing the control-circuit means of the several rectifier-tubes in a manner suitable for producing an operative condition of said rectifier-tubes, the firing-control means for each rectifier-tube including a grid-controlled firing-tube having a grid-circuit including a source of essentially sine-wave firing-control voltage having a fixed predetermined phase-relation with respect to the supply-leads, said phase-relation being so phased, with respect to the supply-voltage of the associated rectifier-tube, as to provide a wide range of firing-control for the rectifier-tube, a source of an initial tube-blocking bias-voltage for the grid-circuit of each firing-tube, a source of a positive bias-voltage for the grid-circuits of the respective firing-tubes, and a rectifier-starting means, including a circuit containing an inductance, for applying said positive-bias source to the grid-circuits of the respective firing-tubes in such manner as to cause successive firing-tubes to fire at different points on their respective sine-wave firing-control voltages during the initial voltage-buildup on said direct-current power-line, whereby to provide a gradual voltage-buildup.

16. A combination including a plurality of supply-leads of a polyphase system having more than three phases, an initially deenergized direct-current power-line, a plurality of rectifier-tubes connected between said supply-leads and said power-line, the rectifier-connections being such as to provide a plurality of serially connected groups of rectifier-tubes, each group comprising a polyphase system of rectifiers, the phases of corresponding rectifiers in successive groups being successively dephased, and a firing-control means for energizing the control-circuit means of the several rectifier-tubes in a manner suitable for producing an operative condition of said rectifier-tubes, the firing-control means for each rectifier-tube including a grid-controlled firing-tube having a grid-circuit including a source of firing-control voltage having a fixed predetermined phase-relation with respect to the supply-leads, a source of an initial tube-blocking bias-voltage for the grid-circuit of each firing-tube, a rectifier-starting means for making a tube-firing bias-voltage effective in the grid-circuits of the firing-tubes of a selected number of successively phased rectifier-tubes, one from each of the plurality of serially connected groups of tubes, and means operating subsequently to said rectifier-starting means, and before the zero-delay point of the phase succeeding the phases of said selected rectifier-tubes, for making a tube-firing bias-voltage effective in the grid-circuits of the firing-tubes of the remainder of the rectifier-tubes.

17. A combination including a plurality of supply-leads of a polyphase system having more than three phases, an initially deenergized direct-current power-line, a plurality of rectifier-tubes connected between said supply-leads and said power-line, the rectifier-connections being such as to provide a plurality of serially connected groups of rectifier-tubes, each group comprising a polyphase system of rectifiers, the phases of corresponding rectifiers in successive groups being successively dephased, and a firing-control means for energizing the control-circuit means of the several rectifier-tubes in a manner suitable for producing an operative condition of said rectifier-tubes, the firing-control means for each rectifier-tube including a grid-controlled firing-tube having a grid-circuit including a source of essentially sine-wave firing-control voltage having a fixed predetermined phase-relation with respect to the supply-leads, said phase-relation being so phased, with respect to the supply-voltage of the associated rectifier-tube, as to provide a wide range of firing-control for the rectifier-tube, a source of an initial tube-blocking bias-voltage for the grid-circuit of each firing-tube, means for providing a brief rectifier-starting voltage-impulse which is suitably synchronized with the polyphase supply-voltage for firing a selected number of successively phased rectifier-tubes, one from each of the plurality of serially connected groups of tubes, a rectifier-starting means for applying said brief rectifier-starting voltage-impulse as a tube-firing bias-voltage to the grid-circuits of the firing-tubes of said selected number of rectifier-tubes, and means operating subsequently to said rectifier-starting means, and before the total output-voltage of said selected rectifier-tubes reaches its maximum value, for applying a continuing positive bias-voltage to the grid-circuits of the firing-tubes of all of the rectifier-tubes.

References Cited in the file of this patent

UNITED STATES PATENTS

| Number | Name | Date |
|---|---|---|
| 1,699,153 | Mittag | Jan. 15, 1929 |
| 2,174,432 | Winegrad | Sept. 26, 1939 |
| 2,179,308 | Taliaferro | Nov. 7, 1939 |
| 2,208,183 | Alexanderson | July 16, 1940 |
| 2,222,696 | Alexanderson | Nov. 26, 1940 |
| 2,285,556 | Batton | June 9, 1942 |
| 2,288,016 | Myers | June 30, 1942 |
| 2,300,872 | Cox | Nov. 3, 1942 |
| 2,313,957 | Myers | Mar. 16, 1943 |
| 2,342,791 | Cox | Feb. 29, 1944 |